(12) United States Patent
Sakai et al.

(10) Patent No.: US 8,531,765 B2
(45) Date of Patent: Sep. 10, 2013

(54) CIRCULARLY POLARIZING PLATE AND DISPLAY DEVICE

(75) Inventors: Akira Sakai, Osaka (JP); Kazuyoshi Sakuragi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 323 days.

(21) Appl. No.: 13/129,535

(22) PCT Filed: Aug. 5, 2009

(86) PCT No.: PCT/JP2009/063887
§ 371 (c)(1),
(2), (4) Date: May 16, 2011

(87) PCT Pub. No.: WO2010/058633
PCT Pub. Date: May 27, 2010

(65) Prior Publication Data
US 2011/0222155 A1 Sep. 15, 2011

(30) Foreign Application Priority Data
Nov. 19, 2008 (JP) .................................. 2008-296056

(51) Int. Cl.
*G02B 5/30* (2006.01)
(52) U.S. Cl.
CPC .................................... *G02B 5/3083* (2013.01)
USPC .................................................... 359/489.07
(58) Field of Classification Search
None
See application file for complete search history.

(56) References Cited

U.S. PATENT DOCUMENTS

| | | | |
|---|---|---|---|
| 6,025,958 A | 2/2000 | Yamaoka et al. | |
| 6,339,460 B1 | 1/2002 | Saitoh | |
| 6,795,246 B2 * | 9/2004 | Yano et al. | 359/489.07 |
| 7,492,516 B2 * | 2/2009 | Takahashi et al. | 359/489.01 |
| 2003/0016446 A1 | 1/2003 | Yano et al. | |
| 2005/0231660 A1 | 10/2005 | Fujita et al. | |
| 2006/0203159 A1 | 9/2006 | Kawamoto et al. | |

FOREIGN PATENT DOCUMENTS

| | | |
|---|---|---|
| JP | H6-281921 A | 10/1994 |
| JP | H7-318925 A | 12/1995 |
| JP | H8-321381 A | 12/1996 |
| JP | 11-149015 A | 6/1999 |
| JP | 2000-39610 A | 2/2000 |

(Continued)

OTHER PUBLICATIONS

International Search Report (ISR) issued in PCT/JP2009/063887 (International application) mailed in Oct. 2009 for Examiner consideration.

*Primary Examiner* — Derek S Chapel
(74) *Attorney, Agent, or Firm* — Chen Yoshimura LLP

(57) ABSTRACT

The present invention provides at low cost a display device with superior visibility and high contrast ratio even in a bright room environment through a reduction in the undesired reflection, not only of the incident outside light from the normal direction, but also of the outside incident light from an oblique direction. The present invention is a circularly polarizing plate including a polarizer and a λ/4 plate, and the aforementioned circularly polarizing plate includes an antireflective layer, the aforementioned polarizer, a birefringent layer, and the aforementioned λ/4 plate which are laminated in this order, the NZ coefficient of the aforementioned birefringent layer satisfies NZ<0.1, the in-plane fast axis of the aforementioned birefringent layer is orthogonal to the absorption axis of the aforementioned polarizer, the NZ coefficient of the aforementioned λ/4 plate satisfies NZ>0.9, and the in-plane slow axis of the aforementioned λ/4 plate intersects the absorption axis of the aforementioned polarizer.

14 Claims, 21 Drawing Sheets

(56) References Cited

FOREIGN PATENT DOCUMENTS

| JP | 2003-29038 A | 1/2003 |
| JP | 2003-75635 A | 3/2003 |
| JP | 2003-302532 A | 10/2003 |
| JP | 2005-326818 A | 11/2005 |
| JP | 2006-268007 A | 10/2006 |
| JP | 2007-24940 A | 2/2007 |

* cited by examiner

FIG. 1
(a)
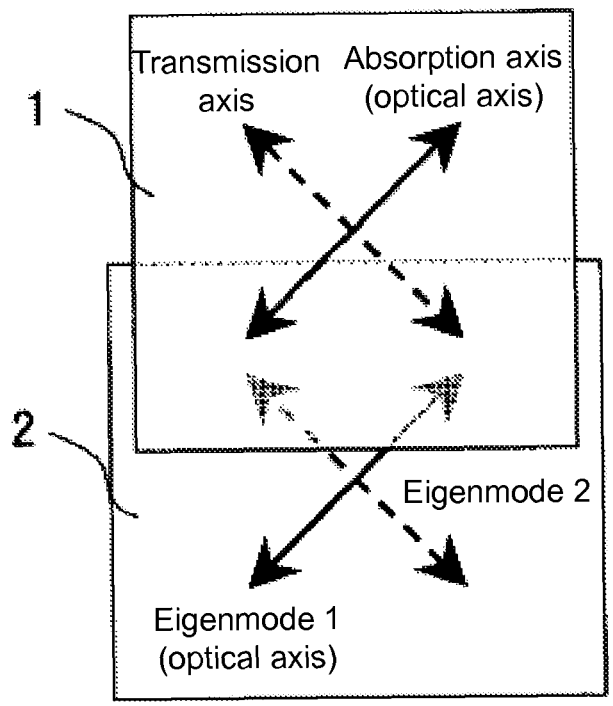
(b)
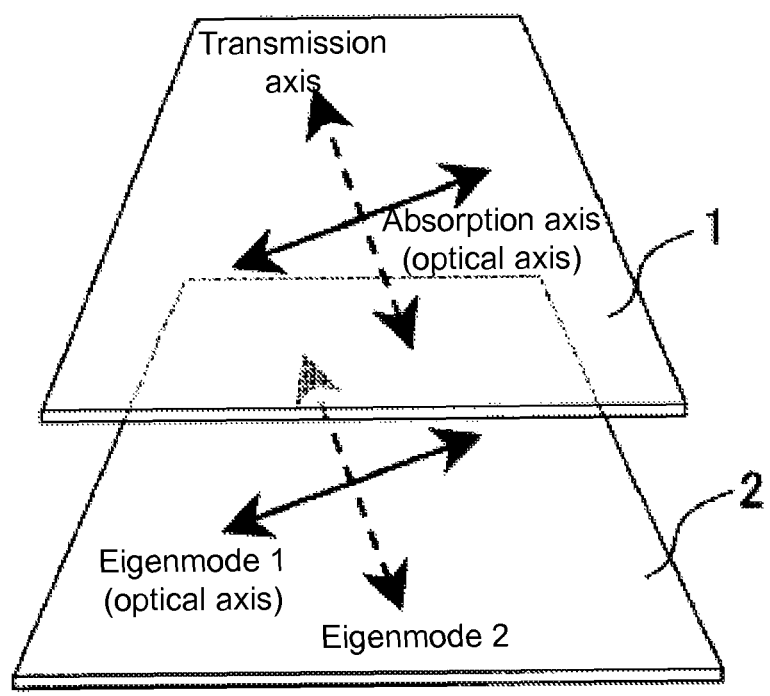

FIG. 2
(a)
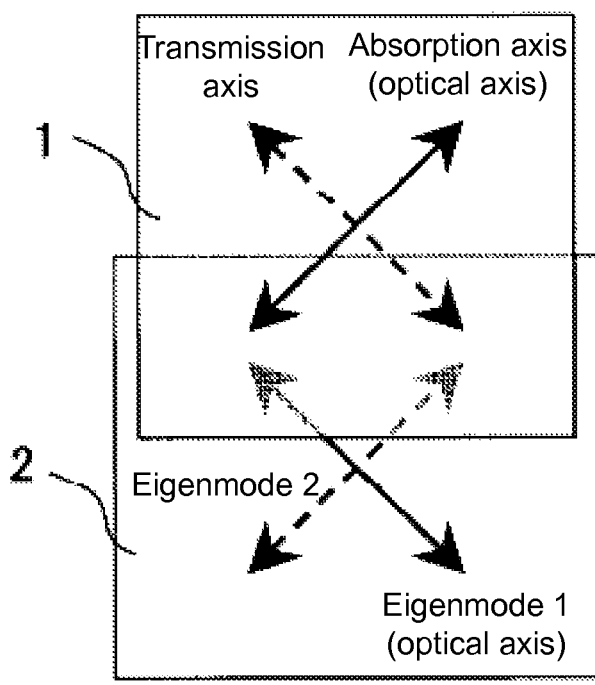
(b)
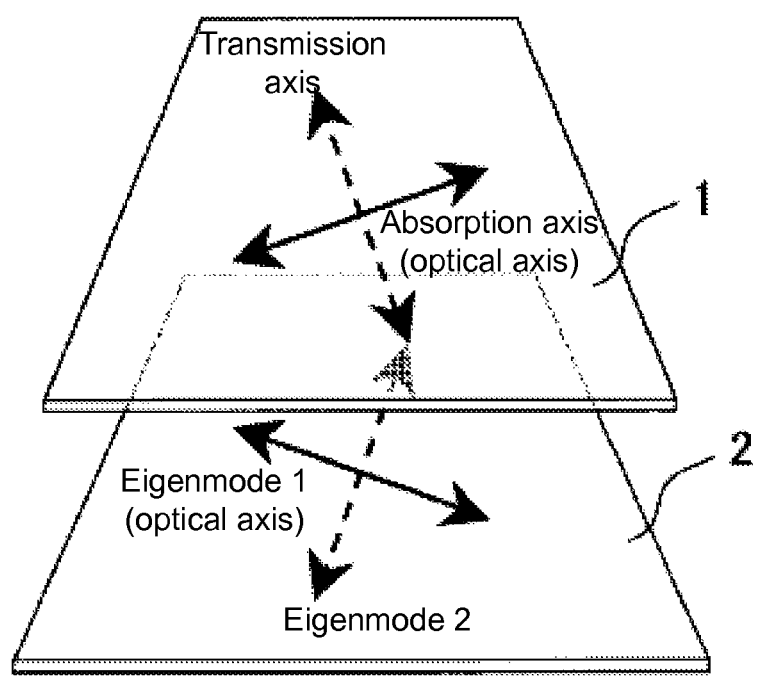

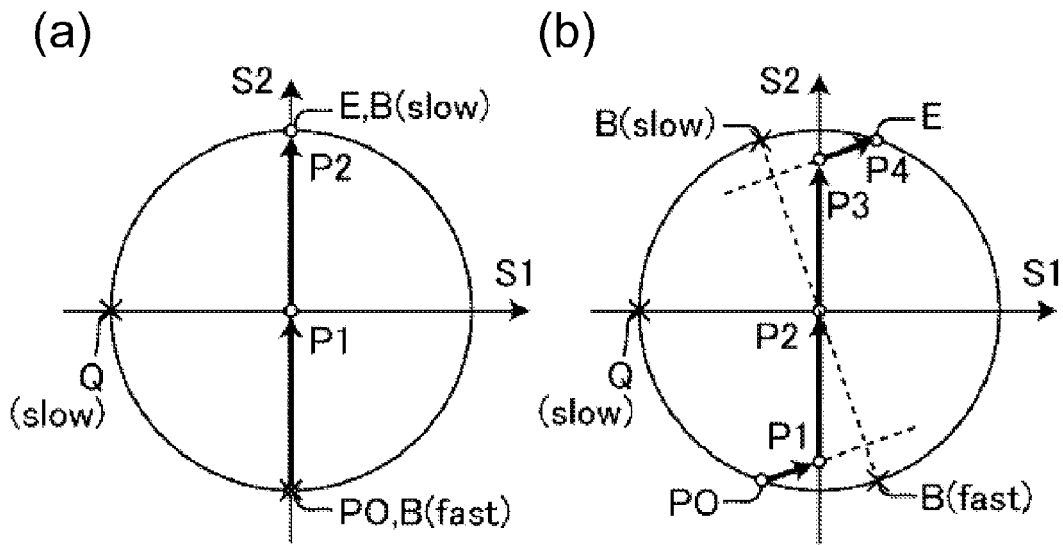

(a) (b)

Isoluminance contour

Isoluminance contour

| | | |
|---|---|---|
| 514 | | |
| 511 | | 0° absorption axis |
| 517 | (NZ=0.75) | 0° slow axis |
| 513 | (NZ=0.5) | 45° slow axis |

| | | |
|---|---|---|
| 514a | | |
| 511a | | 0° absorption axis |
| 517a | (NZ=0.75) | 0° slow axis |
| 513a | (NZ=0.5) | 45° slow axis |
| 513b | (NZ=0.5) | 45° slow axis |
| 517b | (NZ=0.75) | 0° slow axis |
| 511b | | 0° absorption axis |
| 514b | | |

Isoluminance contour

| 614 | | |
|---|---|---|
| 611 | | 0° absorption axis |
| 617 | (NZ=0.25) | 90° slow axis |
| 613 | (NZ=0.5) | 45° slow axis |

CIRCULARLY POLARIZING PLATE AND DISPLAY DEVICE

TECHNICAL FIELD

The present invention relates to a circularly polarizing plate and a display device. More particularly, it relates to a circularly polarizing plate for reducing undesired reflection of outside light and a display device using the circularly polarizing plate and having superior visibility with high contrast ratio in a bright room environment.

BACKGROUND ART

Research work has been ongoing in recent years on various types of display devices, including liquid crystal display devices, electroluminescence (EL) display devices, plasma display panel display devices, and they have been commercialized as display devices for the information processing apparatus, such as computers and televisions. The TFT type liquid crystal display devices (also called TFT LCDs from here on) are particularly widespread, their market size is expected to grow even further, and accordingly, there is a need for further improvements in image quality. For example, display devices with high contrast ratio under all types of environments are needed. While the descriptions below are for the examples of TFT LCD, the present invention is not limited to the TFT LCD and can be applied to a simple matrix LCD or a plasma addressed LCD, or the like, and can in general be applied on all types of LCDs, in which the liquid crystal is held between a pair of substrates, on each of which electrodes are formed, respectively, and a display is made with a voltage applied between the respective electrodes. Furthermore, it is also applicable to so-called self light emitting display devices, including the organic EL display devices, inorganic EL display devices, and PDP display devices.

So-called VA mode liquid crystal display devices have been proposed (see, for example, Patent Document 1), in which the liquid crystal having a negative dielectric anisotropy is aligned vertically between substrates facing one another, in order to meet the requirement for a high contrast ratio. As disclosed in Patent Document 1, when no voltage is applied, the liquid crystal cells in a VA mode liquid crystal display device have almost no birefringence or optical rotation, because the liquid crystal molecules are aligned in an essentially vertical direction with respect to the substrate surface, and the light transmits through the liquid crystal cells with almost no changes in its polarization state. Accordingly, it is possible to realize an essentially perfect black color display when no voltage is being applied, with a pair of polarizers (linear polarizers) placed above and below the liquid crystal cells in such a way that their absorption axes are essentially orthogonal to each other (also called crossed nicols polarizers). When a voltage is applied, the liquid crystal molecules become tilted and essentially parallel to the substrate, exhibiting a large birefringence, and a white color is displayed. Accordingly, such a VA mode liquid crystal display device is able to easily realize a very high contrast ratio.

Nevertheless, there has been room for further improvement, even with the VA mode liquid crystal display device having the construction described above, because the contrast ratio would decrease when viewed under outside light, such as sunlight, or under lighting equipment. It is caused by an apparent rise in the screen brightness under the effect of the reflected outside light off of the display showing the black color, which should be dark. The main causes of the reflection of the outside light are thought to be (1) a reflection off of the topmost surface of the liquid crystal display device on the side which is being observed; and (2) reflection internal (inside the liquid crystal cells) to the liquid crystal display device. The latter includes the reflection off of the metal wiring on the TFT substrate, the reflection off of the transparent electrodes (typically ITO), and the reflection off of the black matrix, formed for color separation of the color filter layers and for blocking light to the TFT device, or the like.

A technology for forming an anti-reflective film, having an anti-reflective effect on the observer side of the polarizing film, which is formed on the topmost surface of the liquid crystal display device—i.e., the observer side of the liquid crystal cells, for reducing the reflection of outside light is widely known and has been commercialized to address the reflection off of the topmost surface of the liquid crystal display device on the observer side, as described above in (1). In general, a polarizing film used for a TFT LCD includes a protective film (typically a TAC film) on its topmost surface on the observer side, and its refractive index is approximately 1.5. For this reason, it has a reflectance of approximately 4% with respect to the incident light incoming from air, when there is no anti-reflective film. On the other hand, it is possible to reduce this to 2% or less by forming the aforementioned anti-reflective film. Nevertheless, a reduction in reflection inside the liquid crystal cells cannot be achieved even when this technology is used.

Accordingly, methods of reducing the reflection inside the liquid crystal cells, as described in (2) above, are being explored, and various proposals have been made (see, for example, Patent Documents 2 through 6). For example, a method of using a low reflectance metal, such as chromium oxide, for the black matrix has been disclosed. In addition, development work on non-metallic, resin based black matrix materials has also been underway and commercialized. Furthermore, Patent Document 2 discloses a method in which an anti-reflective transparent layer is formed between the black matrix and the transparent substrate (typically glass). Nevertheless, according to further studies undertaken by the inventors, it was found that these conventional reflection reduction technologies cannot be applied as remedies on the reflection off of the metallic wiring lines on the TFT substrate or the reflection off of the ITO transparent electrodes, and anti-reflective effects are obtained on limited portions.

Patent Document 3 discloses a method in which the optical transmittance of the visible light in the polarizing plate on the observer side is made lower than those on the light source side. It is possible to reduce reflectance on all portions inside the liquid crystal cells with this method. Nevertheless, according to the investigations undertaken by the present inventors, it was found that the anti-reflective effect obtained with this method is small.

Furthermore, Patent Document 4 discloses a method in which a circularly polarizing plate is placed on the side of the transparent electrode in an organic electroluminescence device. It is possible to reduce reflectance on all portions inside the liquid crystal cells with this method also. However, according to the investigation undertaken by the present inventors, it was found that the anti-reflective effect with respect to the outside incident light from the normal direction of the display device is large, but the anti-reflective effect with respect to the outside incident light from oblique directions, which are different from the direction normal to the display device, is inadequate with this method using the conventional circularly polarizing plate.

On the other hand, Patent Document 5 discloses a method in which the anti-reflective effect on the circularly polarizing plate is obtained across a wide view angle with the lamination of a λ/2 plate with the NZ coefficient of 0.1 to 0.4 and a λ/4 plate with the NZ of 0.3 to 0.7 in such a way that their optical axes intersect. Furthermore, Patent Document 6 discloses a method in which the anti-reflective effect is obtained on the circularly polarizing plate across a wide view angle with the lamination of a λ/2 plate with the NZ coefficient of 0.6 to 0.9 and a λ/4 plate with NZ of 0.3 to 0.7, in such a way that their optical axes intersect.

RELATED ART DOCUMENTS

Patent Documents

Patent Document 1: Japanese Patent Application Laid Open Publication No. 2000-39610
Patent Document 2: Japanese Patent Application Laid Open Publication No. H6-281921
Patent Document 3: Japanese Patent Application Laid Open Publication No. H7-318925
Patent Document 4: Japanese Patent Application Laid Open Publication No. H8-321381
Patent Document 5: Japanese Patent Application Laid Open Publication No. 2003-75635
Patent Document 6: Japanese Patent Application Laid Open Publication No. 2003-29038

SUMMARY OF THE INVENTION

Problems to be Solved by the Invention

Nevertheless, according to the investigation by the present inventors, these methods left room for improvement, because they required a biaxial retardation film satisfying a relationship of $0.1 \leq NZ \leq 0.9$, which is difficult to manufacture and costly.

The present invention has been made in consideration of the aforementioned facts with an object of providing at low cost a display device with superior visibility and high contrast ratio even in a bright room environment through a reduction in undesired reflection of both the outside incident light from the normal direction and the outside incident light from oblique directions.

Means for Solving the Problems

The present inventors examined the various technologies for providing a low cost display device with superior visibility and high contrast ratio even in the bright room environment through a reduction in undesired reflection, not only of the outside incident light from the normal direction, but also of the outside incident light from the oblique directions, and looked into the use of the so-called circularly polarizing plate. The present inventors discovered that it was possible to reduce the unnecessary reflection, not only of the outside incident light from the normal direction, but also of the outside incident light from oblique directions through an appropriate placement of a birefringent layer of NZ<0.1 or NZ>0.9 between the polarizer and the λ/4 plate and through the use of the λ/4 plate of NZ>0.9 or NZ<0.1. Furthermore, the present inventors discovered that the aforementioned λ/4 plate and the birefringent layer can be manufactured using a simple method through the use of a material having an appropriate intrinsic birefringence, unlike the biaxial retardation film that is controlled to have nx>nz>ny (0<NZ<1). As a result, the inventors discovered a clear solution for the issues described above and reached the present invention.

In other words, the present invention is a circularly polarizing plate including a polarizer and a λ/4 plate. The circularly polarizing plate includes an anti-reflective layer, the polarizer, an birefringent layer, and the λ/4 plate, which are laminated in this order, wherein the NZ coefficient of the birefringent layer satisfies NZ<0.1, the fast axis of the birefringent layer is orthogonal to the absorption axis of the polarizer, the NZ coefficient of the λ/4 plate satisfies NZ>0.9, and the slow axis of the λ/4 plate intersects the absorption axis of the circularly polarizing plate polarizer. (Also referred to as the "first circularly polarizing plate of the present invention" hereinafter.)

Accordingly, it is possible to reduce the undesired reflection, not only of the incident outside light from the normal direction, but also of the incident outside light from oblique directions to provide a low cost display device with superior visibility and high contrast ratio even in a bright room environment.

The construction of the first circularly polarizing plate of the present invention is not particularly limited and may or may not contain other constructive elements, as long as it is formed with these necessary constructive elements.

The preferred embodiments of the first circularly polarizing plate of the present invention will be described in detail below. Here, the various embodiments described below may be combined as appropriate.

It is preferable that the in-plane retardation Rxy of the aforementioned birefringent layer satisfy $Rxy \leq 110$ nm from the viewpoint of realizing a high contrast ratio across a wide view angle.

It is preferable that the in-plane slow axis of the aforementioned λ/4 plate form an angle of 43 to 47° or 133 to 137° with respect to the absorption axis of the aforementioned polarizer from the viewpoint of reducing the undesired reflection more effectively.

It is preferable that the in-plane slow axis of the aforementioned λ/4 plate form an angle of 43 to 47° with respect to the absorption axis of the aforementioned polarizer, and that the NZ coefficient of the aforementioned λ/4 plate satisfy $NZ \leq 1.4$ from the viewpoint of reducing the undesired reflection more reliably across a wide view angle without the use of additional birefringent layers other than the aforementioned birefringent layer and the aforementioned λ/4 plate.

Here, it is preferred that the aforementioned λ/4 plate convert the polarized incident light, which is from an oblique direction other than the normal direction and transmitting through the aforementioned polarizer and the aforementioned birefringent layer, into a circularly polarized light. As a result, it is possible to reduce the undesired reflection even more effectively in an embodiment in which those birefringent layers other than the aforementioned birefringent layer and the aforementioned λ/4 plate are not used.

It is preferred that the in-plane slow axis of the λ/4 plate form an angle of 43 to 47° with respect to the absorption axis of the polarizer, the NZ coefficient of the λ/4 plate satisfy NZ>1.4, the circularly polarizing plate further include a positive C plate, and the anti-reflective layer, the polarizer, the birefringent layer, the λ/4 plate, and the positive C plate be laminated in this order, from the viewpoint of reducing the undesired reflection more effectively across a wide view angle.

Here, it is desirable that the aforementioned λ/4 plate and positive C plate convert the polarized incident light, which is from an oblique direction other than the normal direction and transmitting through the aforementioned polarizer and the aforementioned birefringent layer, into a circularly polarized light. As a result, it is possible to reduce the undesired reflection even more effectively in an embodiment in which the positive C plate is used.

It is desirable that the aforementioned anti-reflective layer have a moth eye structure from the viewpoint of achieving the anti-reflective effect even more effectively in the first circularly polarizing plate of the present invention.

The present invention is also a display device having the first circularly polarizing plate of the present invention. As a result, it is possible to realize at low cost a display device with superior visibility and high contrast ratio even in a bright room environment through the reduction of undesired reflection, not only of the incident outside light from the normal direction, but also of the incident outside light from oblique directions.

The present invention, furthermore, is a circularly polarizing plate including a polarizer and a $\lambda/4$ plate. The circularly polarizing plate includes an anti-reflective layer, the polarizer, a birefringent layer, and the $\lambda/4$ plate, which are laminated in this order, the NZ coefficient of the birefringent layer satisfies NZ>0.9, the in-plane slow axis of the birefringent layer is orthogonal to the absorption axis of the polarizer, the NZ coefficient of the $\lambda/4$ plate satisfies NZ<0.1, and the in-plane fast axis of the $\lambda/4$ plate intersects the absorption axis of the polarizer (also called the second circularly polarizing plate of the present invention hereon).

As a result, it is possible to provide at low cost a display device with superior visibility and high contrast ratio even in a bright room environment with the reduction in undesired reflection, not only of the incident outside light from the normal direction, but also of the incident outside light from oblique directions.

The construction of the second circularly polarizing plate of the present invention is not particularly limited and may or may not contain other constructive elements, as long as it is formed with these necessary constructive elements.

Preferred embodiments of the second circularly polarizing plate of the present invention will be described in detail below. Here, the various embodiments shown below may be combined as appropriate.

It is preferred that the in-plane retardation Rxy of the aforementioned birefringent layer satisfy Rxy≦110 nm from the viewpoint of realizing a high contrast ratio across a wide view angle.

It is preferred that the in-plane fast axis of the aforementioned $\lambda/4$ plate form an angle of 43 to 47° or 133 to 137° with respect to the absorption axis of the aforementioned polarizer from the viewpoint of reducing the undesired reflection more effectively.

It is preferred that the aforementioned anti-reflective layer have a moth eye structure from the viewpoint of realizing the anti-reflective effect more effectively in the second circularly polarizing plate of the present invention.

The present invention, furthermore, is a display device including the second circularly polarizing plate of the present invention. As a result, it is possible to realize at low cost a display device with superior visibility and high contrast ratio even in a bright room environment with the reduction in undesired reflection, not only of the incident outside light from the normal direction, but also of the incident outside light from oblique directions.

Effects of the Invention

According to the first and second circularly polarizing plates of the present invention, it is possible to provide at low cost a display device with superior visibility and high contrast ratio even in a bright room environment with a reduction in undesired reflection, not only of the incident outside light from the normal direction, but also of the incident outside light from the oblique directions.

BRIEF DESCRIPTION OF THE DRAWINGS

FIG. 1 is a drawing showing the axial relationship between a birefringent layer and a polarizer, when the optical axis of the polarizer and the optical axis of the birefringent layer are laid out in parallel, as viewed from the front direction. FIG. 1(a) shows an axial relationship between the birefringent layer and the polarizer, when an observation is made from the front direction, while FIG. 1(b) shows an axial relationship between the birefringent layer and the polarizer, when an observation is made from an oblique direction.

FIG. 2 is a drawing showing an axial relationship between the birefringent layer and the polarizer, when the optical axis of the polarizer and the optical axis of the birefringent layer are laid out orthogonally, as viewed from the front direction. FIG. 2(a) shows the axial relationship between the birefringent layer and the polarizer, when an observation is made from the front direction, while FIG. 2(b) shows the axial relationship between the birefringent layer and the polarizer when an observation is made from an oblique direction.

FIG. 8 is a cross-sectional schematic drawing showing a structure optically equivalent to that of FIG. 7.

FIG. 9 is a drawing showing the changes in the polarization states at the circularly polarizing plate of FIG. 8, which are projected onto the S1-S2 plane of the Poincare sphere. FIG. 9(a) is a drawing for an observation made from the front direction (normal direction), while FIG. 9(b) is a drawing for an observation made from an oblique direction (45° azimuth and 60° inclination).

FIG. 13(a) is for an instance in which NZ=1.5 for the $\lambda/4$ plate, while FIG. 13(b) is for an instance in which NZ=2.0 for the $\lambda/4$ plate.

FIG. 17(a) is a drawing for an observation made from the front direction (normal direction), while FIG. 17(b) is a drawing for an observation made from an oblique direction (45° azimuth and 60° inclination).

FIG. 28(a) is a drawing for an observation made from the front direction (normal direction), while FIG. 28(b) is a drawing for an observation made from an oblique direction (45° azimuth and 60° inclination).

FIG. 34(a) is a drawing for an observation made from the front direction (normal direction), while FIG. 34(b) is a drawing for an observation made from an oblique direction (45° azimuth, 60° inclination).

FIG. 38(a) is a drawing for an observation made from the front direction (normal direction), while FIG. 38(b) is a drawing on an observation made from an oblique direction (45° azimuth and 60° inclination).

DETAILED DESCRIPTION OF EMBODIMENTS

Figure 3:
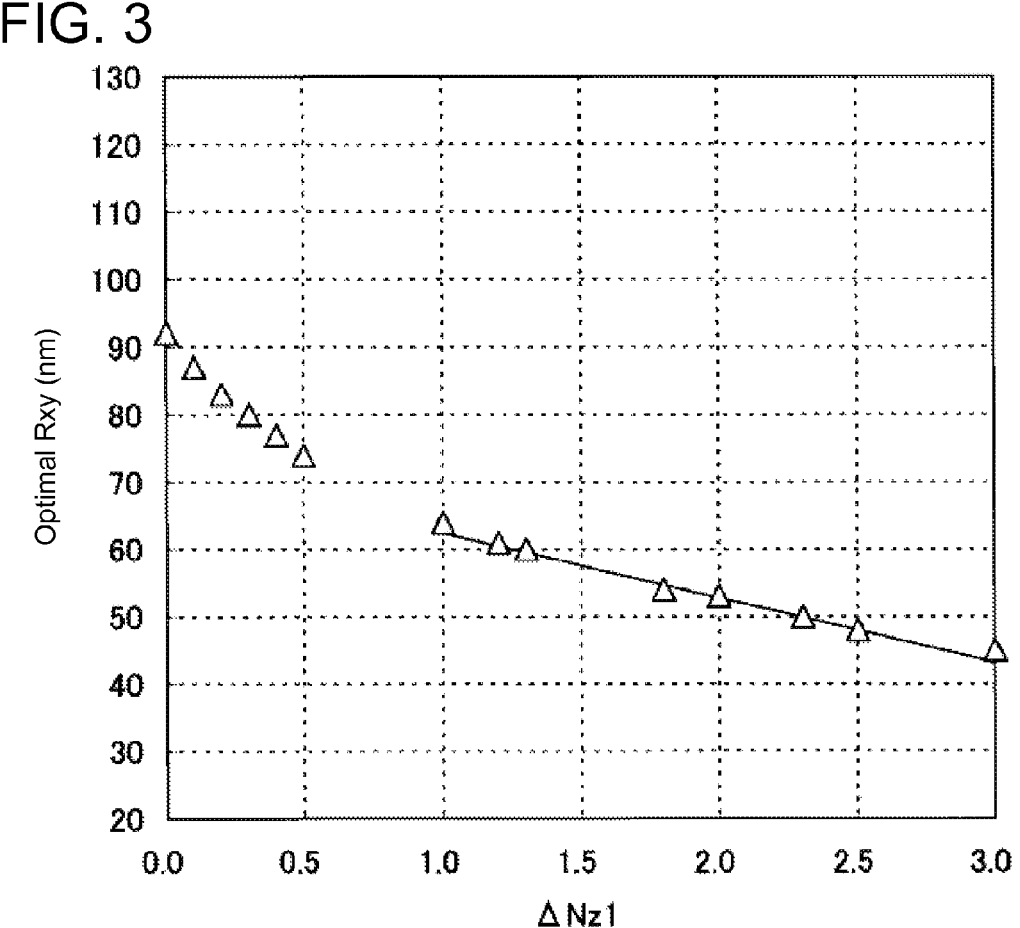
FIG. 3 is a drawing showing a relationship between ΔNZ1 and the optimal Rxy of the birefringent layer A in the first embodiment.

The embodiments are listed below, and the present invention is described in further details with reference to drawings. The present invention, however, is not limited only to these embodiments.

First Embodiment

The circularly polarizing plate of the present embodiment includes an anti-reflective layer, a polarizer, a birefringent layer (also called birefringent layer A henceforth), and a λ/4 plate (also called the λ/4 plate B henceforth), which are laminated in this order. The NZ coefficient of the birefringent layer A satisfies NZ<0.1, the in-plane fast axis of the birefringent layer A is orthogonal to the absorption axis of the polarizer, the NZ coefficient of the λ/4 plate B satisfies NZ>0.9, and the in-plane slow axis of the λ/4 plate B intersects with the absorption axis of the polarizer.

The circularly polarizing plate of the present embodiment includes the polarizer and the λ/4 plate B, the in-plane slow axis of which intersects with the absorption axis of the polarizer and, hence, functions as a so-called circular polarizer and is able to achieve an anti-reflective effect.

Furthermore, the circular polarizing plate of the present embodiment includes a birefringent layer A, the in-plane fast axis of which is orthogonal to the absorption axis of the polarizer, and hence is able to achieve an anti-reflective effect across a wide view angle.

Furthermore, the NZ coefficient of the birefringent layer A satisfies NZ<0.1, and the NZ coefficient of the λ/4 plate B satisfies NZ>0.9, and hence manufacturing is possible at low cost and easily using a conventional manufacturing method.

Furthermore, because the circularly polarizing plate of the present embodiment includes an anti-reflective layer, it is able to effectively achieve an anti-reflective effect across a wide view angle.

Each element of the present embodiment is described below in further detail.

While each of the laminated layers in the circularly polarizing plate of the present embodiment may be in a state in which they are simply stacked, they are, however, preferably laminated in a secured state from the viewpoint of preventing, for example, a shift in the optical axes. Its method of lamination is not specifically limited, and, for example, an appropriate method, such as an adhesion method with a bonding agent or an adhesive agent having excellent transparency, for example, may be used. While the types of adhesive agent or the bonding agent are not specifically limited, they are preferably of a material showing no effective optical anisotropy. Furthermore, the bonding agent and the adhesive agent preferably do not require a high temperature process of curing and drying and preferably do not require a long curing treatment time or drying time from the view point of preventing a change in the optical characteristics of the circularly polarizing plate.

In the present specification, a "polarizer" refers to a device having a function of converting the natural light into a linearly polarized light and is equivalent to a polarizer plate or a polarizer film. It is preferable to use a so called O type polarizer, in which an anisotropic material, such as an iodine complex having a dichroic property, is adsorption-aligned on a polyvinyl alcohol (PVA) film, as the polarizer. Normally, it is provided for commercial use with a lamination of protective films, such as triacetyl cellulose (TAC) films on both sides of the PVA film in order to ensure a mechanical strength and humidity protection. However, unless specifically provided, a "polarizer" in the present specification does not include the protective films and refers only to an element having a polarizing function. Furthermore, an "O type polarizer" in the present specification refers to a polarizer, which absorbs light that oscillates in a specific direction (which is defined as the absorption axis) in the device plane, transmits light, that oscillates in a direction perpendicular to the absorption axis in the device plane, and transmit light that oscillates in a direction normal to the device plane. In other words, the O type polarizer refers to a polarizer having a single absorption axis and two transmission axes, and the optical axis of the O type polarizer is aligned in the direction of the absorption axis.

Furthermore, it is preferable that other birefringent layers not be placed between the polarizer and the birefringent layer A and between the birefringent layer A and the λ/4 plate B, so that the effects of the present invention can be effectively obtained. Accordingly, isotropic films (for example, protective films) may be placed between the polarizer and the birefringent layer A and between the birefringent layer A and the λ/4 plate B, as appropriate.

As thus described, the polarizer may be protected by protective films, such as the TAC films, but should preferably be held between the anti-reflective layer and the birefringent layer A without protective films therebetween, from the viewpoint of cost reduction and a thinner form factor. In other words, the anti-reflective layer and the birefringent layer A may also be the protective films of the polarizer.

A "birefringent layer" in the present specification refers to a layer having an optical anisotropy and is equivalent to a retardation film, a retardation plate, an optically anisotropic layer, a birefringent medium, or the like.

An "NZ coefficient (NZ)" in the present specification is defined as NZ=(nx−nz)/(nx−ny), where nx and ny are the main refractive indices in the in-plane directions of the birefringent layer (such as the liquid crystal cell and the λ/4 plate B) satisfying, nx>ny, and nz is the main refractive index in the out-of-the plane direction (along the thickness direction). Unless specifically provided, the main refractive indices and the phase retardation are measured at a wavelength of 550 nm in the present specification. Furthermore, birefringent layers having the same NZ coefficient may have different effective phase retardations in the birefringent layers with respect to an incident light from an oblique direction due to the effects of the angles of refraction, when the average index of refraction=(nx+ny+nz)/3 of the birefringent layers is different between the two. As a result, the design guideline becomes complicated. In order to avoid this problem, the NZ coefficients of all birefringent layers (including the liquid crystal cell and the λ/4 plate B) are calculated with the average refractive index always being at 1.5 in the present specification unless specifically indicated otherwise. Conversions are made even for birefringent layers having an actual average index of refraction, that is different from 1.5 with the average refractive index set to be at 1.5. The retardations Rxz, which will be described later, are also treated in the same way.

There is a concern that, when the NZ coefficient of the birefringent layer A is greater than 0.0, manufacturing may be difficult because a relationship nx>nz>ny must be satisfied. On the other hand, a birefringent layer satisfying NZ≦0.0, in general, can be manufactured easily using a regular manufacturing method (using, for example, horizontal uniaxial stretching and vertical-horizontal biaxial stretching). However, an attempt at manufacturing a birefringent layer satisfying NZ≦0.0 may unintentionally result in a birefringent layer of NZ=0.1 approximately. For this reason, a birefringent layer A with NZ<0.1 can be easily manufactured.

From the viewpoint of manufacturing the birefringent layer A more easily, the birefringent layer A should preferably satisfy −3.0≦NZ≦−0.1. This is because a birefringent layer satisfying −3.0≦NZ≦−0.1 can be manufactured by conducting a generic vertical-horizontal biaxial stretching using typically a material having a negative intrinsic birefringence. For this reason, it is preferable to construct the birefringent layer A with a material having a negative intrinsic birefringence. This is also preferable because when the birefringent layer A satisfying −3.0≦NZ≦−0.1 is manufactured with the aforementioned stretching method with a material having a negative intrinsic birefringence, it is possible to make the in-plane fast axis be in a 90° direction (orthogonal direction) with respect to a rolled retardation film and, hence, it is preferable from the viewpoint of making a roll-to-roll adhesion of the birefringent layer A with the polarizer becomes possible. The birefringent layer A may satisfy NZ<0.1, and the in-plane fast axis may be orthogonal to the absorption axis of the polarizer, when the circularly polarizing plate is viewed from the normal direction.

Here, in order to realize a high contrast ratio across a wide view angle, that is, to realize an anti-reflective effect without reducing the contrast ratio in the normal direction, in principle, it is necessary, as described above, for the in-plane fast axis of the birefringent layer A (optical axis of the birefringent layer A) and the absorption axis of the polarizer form a 90° angle. The reason for this is described next.

It is necessary that (1) the birefringent layer A not function in the normal direction, in order for the contrast ratio not to be reduced in the normal direction, and it is necessary that (2) the birefringent layer A function effectively in the oblique directions in order for the view angle compensation to work.

In order to satisfy the aforementioned condition (1), it is necessary that the axial relationship between the birefringent layer A and the polarizer satisfy one of the following relationships: (a) the optical axis of the polarizer (polarizer 1 in FIGS. 1 and 2) and the optical axis of the birefringent layer A (birefringent layer 2 in FIGS. 1 and 2) are in parallel (see FIG. 1(*a*)) when viewed from the normal direction; or (b) the optical axis of the polarizer 1 and the optical axis of the birefringent layer 2 are orthogonal, when viewed from the normal direction (see FIG. 2(*a*)).

Here, the "optical axis" in the present specification is different from the optical axis as strictly defined in the field of crystal optics and is defined as described next. That is, "the optical axis" refers to the principal axis corresponding to the principal refractive index out of the three principal refractive indices of the birefringent layer, with which the difference with respect to their average value has a maximum absolute value. For this reason, even when a birefringent layer is optically biaxial, this birefringent layer has one "optical axis" instead of two. Accordingly, the "optical axis" of the biaxial birefringent layer corresponds to the optical axis, in the conventional definition when the biaxial birefringent layer is optically approximated to a uniaxial birefringent layer.

On the other hand, in order to satisfy the aforementioned condition (2), it is necessary to satisfy the relationship (b), instead of the relationship (a). This is because, when light enters from an oblique direction into the laminated body of the polarizer 1 and the birefringent layer 2, the birefringent layer 2 does not effectively contribute at all in this oblique direction, if the effective transmission axis of the polarizer 1, when viewed from this oblique direction, is in parallel to one of the oscillation directions of the two eigenmodes of oscillation (oscillation directions of the dielectric displacement vector D) of the birefringent layer 2 with respect to the incident light from this oblique direction. Accordingly, in order for the birefringent layer 2 to function effectively in this oblique direction, it is necessary that the effective transmission axis of the polarizer 1, when viewed from this oblique direction, be neither in parallel or orthogonal to the oscillation directions of the eigenmodes of oscillation of the polarization modes of the birefringent layer. When the optical axis of the polarizer 1 and the optical axis of the birefringent layer 2 are in parallel as in (a), the effective transmission axis of the polarizer 1 and one of the oscillation directions of the two eigenmodes of oscillation of the birefringent layer 2 become parallel to each other, no matter what direction it is viewed from, as shown in FIG. 1(*b*), and the birefringent layer 2 does not function effectively. On the other hand, when the optical axis of the polarizer 1 and the optical axis of the birefringent layer 2 are orthogonal as in (b), the birefringent layer 2 functions effectively, because the effective transmission axis of the polarizer 1 and the oscillation directions of the intrinsic polarization modes of the birefringent layer 2 are neither in parallel or orthogonal in the oblique directions, as shown in FIG. 2(*b*).

As thus described, the object of the birefringent layer A is not for adding a retardation to the incidence light from the normal direction. On the other hand, an angle formed by the absorption axis of the polarizer and the optical axis of the $\lambda/4$ plate B in the oblique direction appears different from that viewed from the normal direction, but this angular difference is compensated by the retardation in the birefringent layer A. In other words, the birefringent layer A adds a retardation only to the incident light from the oblique directions with an object of performing a view angle compensation.

When the birefringent layer satisfies NZ=0.0, it becomes a uniaxial birefringent layer, and the axis (the in-plane fast axis) orthogonal to the in-plane slow axis becomes the optical axis. Hence, the optical axis of the birefringent layer is oriented parallel to the in-plane fast axis direction, even when NZ<0.0 or 0.0<NZ<0.1 is satisfied. Therefore, it is preferred that the in-plane fast axis of the birefringent layer A and the absorption axis of the polarizer form a 90° angle, when the circularly polarizing plate is viewed from the normal direction, but it is also acceptable when they form an angle slightly off of 90°, as long as it is within a range in which a high contrast ratio or, in other words, the anti-reflective effect can be realized across a wide view angle. Specifically, the effects of the present invention can be obtained adequately as long as the in-plane fast axis of the birefringent layer A and the absorption axis of the polarizer are within a range of 90°±1° (89 to 91°), when the circularly polarizing plate is viewed from the normal direction.

The results measured by computer simulation on a relationship between the biaxial parameter $\Delta NZ1$ of the birefringent layer A and the optimal in-plane retardation Rxy of the birefringent layer A are shown here. FIG. 3 and Table 1 below are a graph and a table showing the relationship between the $\Delta NZ1$ and the optimal in-plane retardation Rxy of the birefringent layer A of the first embodiment. The birefringent layer A satisfies NZ=0, when it is a uniaxial birefringent layer. Hence, the biaxial parameter $\Delta NZ1$ of the birefringent layer A is defined as |NZ|. The optimal Rxy is set at a value at which the contrast ratio is maximum, when the circularly polarizing plate disposed on a reflective plate is observed from a direction that forms 45° with respect to the absorption axis of the polarizer.

Here, the "in-plane retardation Rxy" in the present specification refers to the in-plane retardation (unit: nm) as defined by $Rxy=(nx-ny) \times d$, where nx and ny is the principal refractive indices in the in-plane directions of a birefringent layer (including a liquid crystal cell and a $\lambda/4$ plate) and $nx \geq ny$, nz is the principal refractive index in the out-of-plane direction (thickness direction), and d is the thickness of the birefringent layer. Furthermore, the "in-plane slow axis of the birefringent layer" refers to the direction of the principal dielectric axis (x-axis direction) corresponding to the principal refractive index nx, and the "in-plane fast axis of the birefringent layer" refers to the direction in the plane that is orthogonal to the in-plane slow axis. Furthermore, the out-of-plane retardation Rxz, to be described later, refers to the out-of-plane (thickness direction) retardation (unit: nm), as defined by $Rxz=(nx-nz) \times d$, where nx and ny are the principal refractive indices in the in-plane directions of the birefringent layer (including a liquid crystal cell and a $\lambda/4$ plate) and $nx \geq ny$, nz is the principal refractive index in the out-of-plane direction (thickness direction), and d is the thickness of the birefringent layer. Furthermore, the retardation Rlc of the liquid crystal cell is defined as |Rxz|. Unless specifically indicated otherwise, the principal refractive indices and retardations are measured at the wavelength of 550 nm in the present specification.

From the standpoint of realizing a display with high contrast ratio across a wide view angle, it is most preferable that the in-plane retardation Rxy of the birefringent layer A be at the optimal value shown in FIG. 3 and Table 1, but it is also acceptable that it slightly deviate from the optimal value, as long as it is within a range in which the contrast ratio does not go down at oblique view angles. From the viewpoint of adequately achieving the effects of the present invention, the range should preferably be within the optimal value ±15 nm.

As can be understood from FIG. 3 and Table 1, the relationship between ΔNZ1 and the optimal in-plane retardation Rxy of the birefringent layer A is not, in general, simple. However, the equation (1) below provides a sufficiently adequate approximation within a range of −3.0≦NZ≦−1.0 (1.0≦ΔNZ1≦3.0). The straight line (solid line) shown in FIG. 3 represents this.

$$Rxy=(72-9.6\times \Delta NZ1) \qquad (1)$$

Furthermore, it can be said, according to FIG. 3 and Table 1, that the in-plane retardation Rxy of the birefringent layer A preferably is within a range of 45 to 64 nm within a range of −3.0≦NZ≦−1.0 (1.0≦ΔNZ≦3.0).

TABLE 1

| NZ of birefringent layer A | ΔNz1 | Rxy of birefringent layer A |
| --- | --- | --- |
| 0.0 | 0.0 | 92 |
| −0.1 | 0.1 | 87 |
| −0.2 | 0.2 | 83 |
| −0.3 | 0.3 | 80 |
| −0.4 | 0.4 | 77 |
| −0.5 | 0.5 | 74 |
| −1.0 | 1.0 | 64 |
| −1.2 | 1.2 | 61 |
| −1.3 | 1.3 | 60 |
| −1.8 | 1.8 | 54 |
| −2.0 | 2.0 | 53 |
| −2.3 | 2.3 | 50 |
| −2.5 | 2.5 | 48 |
| −3.0 | 3.0 | 45 |

The "λ/4 plate" in the present specification refers to a layer having an optical anisotropy of essentially ¼ wavelength with respect to at least light having a wavelength of 550 nm (137.5 nm precisely but acceptable as long as it is greater than 115 nm and less than 160 nm) and is the same as a λ/4 retardation film or a λ/4 retardation plate. In other words, the λ/4 plate B is also a birefringent layer.

Accordingly, the circularly polarizing plate of the present invention (the first and the second circularly polarizing plates of the present invention) is not necessarily limited to those generating a completely circular polarization and may also be those generating an elliptical polarization, as long as it is within a range in which an anti-reflective effect is obtained.

The birefringent layer becomes a uniaxial birefringent layer, when NZ=1.0 is satisfied, and the in-plane slow axis becomes the optical axis. Hence, the orientation of the optical axis of the birefringent layer is in a direction parallel to the in-plane slow axis, even when it satisfies NZ>1.0 or 1.0>NZ>0.9. Therefore, the optical axis of the λ/4 plate B is oriented in a direction parallel to the in-plane slow axis.

When the NZ coefficient of the λ/4 plate B is less than 1.0, there is a concern that the manufacturing may become difficult in order for the relationship nx>nz>ny to be satisfied. On the other hand, in general, a birefringent layer satisfying 1.0<NZ can easily be manufactured using a regular manufacturing method (for example, a uniaxial stretching or vertical-horizontal biaxial stretching, or the like). However, when a birefringent layer satisfying 1.0≦NZ is being manufactured, a birefringent layer having an NZ of about 0.9 may occasionally be formed unintentionally. Accordingly, when the λ/4 plate B satisfying NZ>0.9 is targeted, it can be manufactured with ease.

The λ/4 plate B is placed in such a way that the in-plane slow axis intersects the absorption axis of the polarizer. It is possible to create the function of a left (or right) circularly polarizing plate with this combination of the λ/4 plate B and the polarizer.

The in-plane slow axis of the λ/4 plate B preferably is aligned in a direction which forms an angle of 43 to 47° (more preferably, essentially 45°) or 133 to 137° (more preferably, essentially 135°) with respect to the absorption axis of the polarizer, when the circularly polarizing plate is viewed from the normal direction. As a result, it is possible to make the light transmitting through the polarizer and the λ/4 plate B approach perfect circular polarization. Accordingly, it is possible to realize an anti-reflective effect more effectively in the normal direction and, as a result, it is possible to realize a higher contrast ratio for the normal direction.

It is preferred that the NZ coefficient of the λ/4 plate B satisfy NZ≦1.4, when the in-plane slow axis of the λ/4 plate B forms a 43 to 47° angle with respect to the absorption axis of the polarizer from the viewpoint of reducing undesired reflection more reliably across a wide view angle without a use of a birefringent layer (for example, a positive C plate to be described later) other than the birefringent layer A and the λ/4 plate B.

Furthermore, it is preferred that the λ/4 plate B of NZ≦1.4 have a retardation approximately of such a level that the λ/4 plate B can convert polarized light, which comes in from an oblique direction other than the normal direction and passes through it, to circularly polarized light. That is, it is preferred that the λ/4 plate B convert polarized light (linearly polarized light or an elliptically polarized light), which comes in from an oblique direction other than the normal direction (for example, a direction having the azimuth of 60° relative to the absorption axis of the polarizer and an inclination of 45° relative to the normal direction) and which has passed through the polarizer and the birefringent layer A, into circularly polarized light. This way, it is possible to more effectively reduce undesired reflection in case where a birefringent layer, other than the birefringent layer A and the λ/4 plate B, is not used.

Here, "conversion of the polarized light (linearly polarized light or elliptically polarized light) into circularly polarized light" in the present specification is not limited to an embodiment in which the polarized light (linearly polarized light or elliptically polarized light) is converted into a perfectly circularly polarized light, and it is acceptable that the converted circularly polarized light deviates from perfectly circularly polarized light, as long as it is within the range in which the effect of the present invention can be obtained.

It is preferred that the NZ coefficient of the λ/4 plate B satisfy NZ>1.4, the circularly polarizing plate of the present embodiment further include a positive C plate, and the anti-reflective layer, polarizer, birefringent layer A, λ/4 plate B, and positive C plate be laminated in this order, when the in-plane slow axis of the λ/4 plate B forms an angle of 43 to 47° with respect to the absorption axis of the polarizer, from the viewpoint of reducing the undesired reflection more effectively across a wide view angle.

It is preferred that the out-of-plane retardation Rxz of the positive C plate be set appropriately in accordance with the NZ coefficient of the λ/4 plate B and the NZ coefficient and out-of-plane retardation Rxz of the birefringent layer A. It is preferred that the out-of-plane retardation Rxz be such that it can make up for the deficiency in the effective retardation value of the λ/4 plate B of NZ>1.4, and that polarized light, which comes in from an oblique direction other than the normal direction and passes through the positive C plate, be converted into a circularly polarized light. Accordingly, it is preferred that the λ/4 plate B and the positive C plate convert polarized light (linearly polarized light or elliptically polarized light), which comes in from oblique directions other than the normal direction (for example, a direction having an azimuth angle of 60° relative to the absorption axis of the polarizer and having an inclination of 45° relative to the normal direction) and which has passed through the polarizer and the birefringent layer A, into circularly polarized light. As a result, it is possible to more effectively reduce undesired reflection in cases where a positive C plate is used.

On the other hand, the in-plane retardation Rxy of the positive C plate does not necessarily need to be 0 nm, as long as it is within a range in which the effects of the present invention can be obtained, and preferably satisfies 0 nm≦Rxy≦10 nm specifically (even more preferably, 0 nm≦Rxy≦5 nm). Furthermore, it is preferred that other birefringent layers not be formed between the positive C plate and the λ/4 plate B, in order to more effectively obtain the effect of the present invention. Therefore, it is acceptable that an isotropic film be placed between the positive C plate and the λ/4 plate B, as appropriate, but it is preferred that the isotropic film not be placed from the viewpoint of cost reduction and thickness reduction.

It is preferred that, even when the in-plane slow axis of the λ/4 plate B forms an angle of 133 to 137° with respect to the absorption axis of the polarizer, the design be implemented similarly to when an angle of 43 to 47° is formed.

It is preferred that the λ/4 plate B satisfy 1.1≦NZ≦4.0 from the viewpoint of making the manufacturing of the λ/4 plate B even easier. This is because a birefringent layer satisfying 1.1≦NZ≦4.0 can be manufactured by conducting a general-known horizontal uniaxial stretching or vertical-horizontal biaxial stretching using typically a material having a positive intrinsic birefringence. For this reason, it is preferred that the λ/4 plate B be constructed of a material having a positive intrinsic birefringence. When the λ/4 plate B, which satisfies 1.1≦NZ≦4.0, is manufactured using the aforementioned stretching method from a material having a positive intrinsic birefringence, it is possible to have the in-plane slow axis in a 90° direction (orthogonal direction) with respect to the length direction of a roll shaped retardation film.

The material and optical properties of the birefringent layers (including the λ/4 plate B) used in the present embodiment are not specifically limited. It is possible to use, for example, a polymer film that has been stretched, a liquid crystal material with a fixed orientation, and a thin plate made of an inorganic material.

The method of forming the birefringent layer (including the λ/4 plate B) used in the present embodiment is not specifically limited. It is possible to use, for example, a solvent casting method and a melt extrusion method for the polymer film. It is also possible to use a method in which a plurality of birefringent layers are formed simultaneously with a co-extrusion method. Stretching may be conducted, or stretching may not be conducted, as long as the desired retardation is achieved. The stretching method is not specifically limited, and it is possible to use, for example, a roll-to-roll tension stretching method, a roll-to-roll compressive stretching method, a tenter horizontal uniaxial stretching method, and vertical-horizontal biaxial stretching method as well as a specialized stretching method in which stretching is conducted under the effect of a compressive force in a heat shrinking film. Furthermore, when a liquid crystal material is used, it is possible to use a method in which the liquid crystal material is coated on a substrate film on which an alignment treatment has been conducted to fix the orientation of the liquid crystal material, for example. Also, as long as the desired retardation is achieved, a method in which no special alignment treatment is conducted on the substrate film may be used. Also, a method in which once the orientation is fixed, the film may be stripped off from the substrate film and may be transferred onto another film. Furthermore, a method in which the liquid crystal material orientation is not fixed may also be used. Also, for a non liquid crystal material, a formation method similar to cases for the liquid crystal material may be used. Further specifics are described below by the types of birefringent layers.

For the birefringent layer A, a film that is made by stretching a film including a material having a negative intrinsic birefringence as a component, and a film that is made by stretching, under the effect of a compressive force in a heat shrinking film, a film including a material having a positive intrinsic birefringence as a component may be used, for example. Between these, a film that is made by stretching a film including a material having a negative intrinsic birefringence as a component is preferred from the viewpoint of simplifying the manufacturing method. It is acceptable that the birefringent layer A be a lamination of two layers or more of the birefringent layers, but a single layer (formed with a unitary film) is preferred from the viewpoint of simplifying and reducing the cost of manufacturing, as described above. Materials having a negative intrinsic birefringence include polystyrene, polyvinyl naphthalene, polyvinyl biphenyl, polyvinyl pyridine, poly methyl methacrylate, poly methyl acrylate, N substituted maleimide copolymer, fluorene based polycarbonate, and triacetyl cellulose (those especially of low degree of acetylation), for example.

For the λ/4 plate B, a film, a film that is made by stretching a film including a material having a positive intrinsic birefringence as a component may be used, for example. While the λ/4 plate B may be a lamination of two or more layers of birefringent layers, a single layer (formed with a unitary film) is preferred, from the viewpoint of making the manufacturing easier and less costly, as described above. Materials having a positive intrinsic birefringence include, for example, polycarbonate, polysulfone, polyethersulfone, polyethylene terephthalate, polyethylene, polyvinyl alcohol, norbornene, triacetyl cellulose, and diacetyl cellulose.

The anti-reflective layer (anti-reflective film) is a layer (film) formed on the surface of the circularly polarizing plate and having a function of suppressing surface reflection off of the circularly polarized plate. An antireflection layer (AR layer) and a low reflection layer (LR layer), both of which an anti-reflective effect is achieved with a laminated thin film with controlled refractive index and thickness as well as a moth eye structure, with which an anti-reflective effect is obtained with a microstructure such as those seen in the eyes of a moth, may be used as the anti-reflective layers.

The antireflection layer (AR film) takes advantage of the optical interference effects to suppress the reflectance itself. A method of forming the AR layer includes a sputtering method, for example. A vacuum deposition method like sputtering, however, is costly, does not offer an adequate adhesion to a plastic film, and hardly achieves a uniform deposition across a large surface, however. On the other hand, lamination of a plurality of layers having different indices of refraction by wet coating is also possible. While the reflectance of an AR layer manufactured by sputtering is normally 0.3% or less, reflectance of a film manufactured by this wet coating is higher in many cases at around 1.0%. For this reason, the film manufactured by this wet coating is distinguished from the AR and is called the LR layer (LR film).

An LR film manufactured by wet coating has a basic structure in which a high refractive index layer and a low refractive index layer are laminated one after the other on a main body.

Any other layers may be formed, as needed, between the main body and the high refractive index layer, between the high refractive index layer and the low refractive index layer, and on the low refractive index layer. Here, the "high refractive index" and the "low refractive index" do not specify any specific value of the refractive index, and "high" and "low" refer to the relative indices of refraction of the two layers in comparison. Reflectance is at the lowest when the two layers have a relationship defined by $n2=(n1)^{1/2}$, where n1 is the refractive index of the high refractive index layer, and n2 is the refractive index of the low refractive index layer.

The materials for the high refractive index layer material of the LR film manufactured by wet coating are, for example, organic polymer materials including such elements as sodium, bromine, and sulfur to enhance its refractive index, or materials including microcrystals of metal oxide of high refractive index, such as titanium oxide, zirconium oxide, and zinc oxide dispersed throughout the layer. For the low refractive index layer, to reduce the refractive index, organic polymer containing fluorine, low refractive index silica, and magnesium fluoride, for example, have been used. Furthermore, air may be introduced by a deposition of microparticles with air pockets to produce a material of low refractive index.

The "moth eye structure" in the present specification refers to a structure with reduced reflectance on its surface resulting from a dense formation of extrusions with structures smaller than the wavelength of the incoming electromagnetic waves (for example, visible light) on the material surface. The refractive index of the moth eye structure changes continuously from the surface to the inside, and the reflectance can be made to essentially 0%. The moth eye structure derives its name from the structure seen in the eyes of certain types of moths. The moth eye structure is used as the anti-reflective films on screens and displays, for example. The moth eye structure can be formed by a known method on the surface of a resin, for example.

Figure 4:
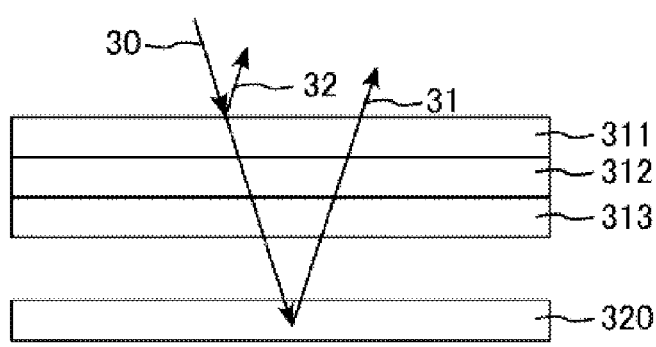
FIG. 4 is a schematic cross-sectional drawing showing a liquid crystal display device of a comparison example that does not include an anti-reflective layer.
Figure 5:
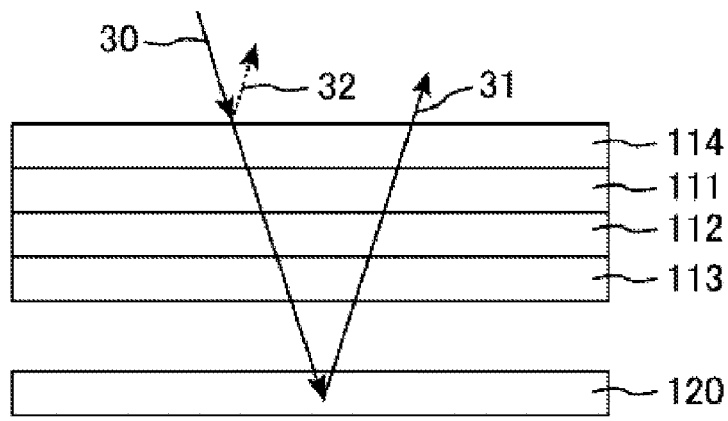
FIG. 5 is a cross-sectional schematic drawing showing a liquid crystal display device of the first embodiment that includes an anti-reflective layer.

Here, the circularly polarizing plate of the present embodiment is able to achieve an anti-reflective effect without an anti-reflective layer. The anti-reflective layer is formed, however, for the following reasons. Here, an example of a liquid crystal display device is described in which the circularly polarizing plate of the present embodiment is formed on a surface of a liquid crystal cell. FIG. 4 is a cross-sectional schematic drawing showing the liquid crystal display device of a comparison example without an anti-reflective layer. FIG. 5 shows a cross-sectional schematic drawing of the liquid crystal display device of the first embodiment with the anti-reflective layer.

The liquid crystal display device of the comparison example without the anti-reflective layer includes a circularly polarizing plate, in which a linear polarizer 311, birefringent layer 312, and λ/4 plate 313 are laminated in this order, that is placed on the display face side of the liquid crystal cell 320. As shown in FIG. 4, when external light 30 comes into the liquid crystal display device, which has no anti-reflective layer, a reflective component from the topmost surface of the polarizer 311 (reflected light 32) adds to the reflected light 31, which reflects from the inside of the liquid crystal cell 320, and the total reflected light (reflectance) becomes very large. The reflectance of a conventional circularly polarizing plate, for which typical materials and design are used, is 4% for the reflected light 32, and is essentially 0% for the reflected light 31 for the external light (not shown in the drawing) incident from the normal direction. When the incident external light 30 comes in from an oblique direction, as shown in the drawing, the reflectance for the reflected light 32 does not change much and remains at around 4%, but the reflectance for the reflected light 31 rises rapidly with the changing angle. In other words, in the conventional circularly polarizing plate, the anti-reflective effect on the reflected light 31 reflecting inside the liquid crystal cell 320 is satisfactory only in the normal direction, and is unsatisfactory in other oblique directions.

The present invention, on the other hand, addresses the view angle dependence of this anti-reflective effect. The liquid crystal display device of the first embodiment with the anti-reflective layer includes a circularly polarizing plate, in which the anti-reflective layer 114, linear polarizer 111, birefringent layer 112, and λ/4 plate 113 are laminated in this order, which is placed on the display face side of the liquid crystal cell 120. As shown in FIG. 5, the reflected light 32, which is reflected from the topmost surface of the polarizer 111, is already suppressed at a low level when the anti-reflective layer 114 is present. Thus, it is worthwhile to cure the reflectance dependence of the view angle caused by the reflected light 31, which is reflected inside the liquid crystal cell 120. However, in the comparison example shown in FIG. 4, the reflectance caused by the reflected light 32 is large. Therefore, it is not worthwhile to reduce the reflectance caused by the reflected light 31 through the deployment of the circularly polarizing plate, which includes the linear polarizer 311, birefringent layer 312, and the λ/4 plate 313.

When a moth eye structure is used for the anti-reflective layer, the reflectance due to the reflected light 32 can be made to be essentially 0%. Hence, the anti-reflective effect on the reflected light 31 can be appreciated even more effectively.

Embodiment 1

Figure 6:
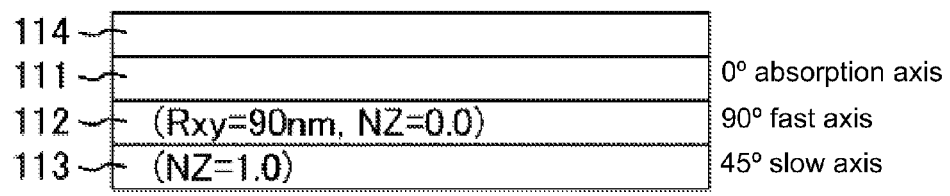
FIG. 6 is a cross-sectional schematic drawing showing a circularly polarizing plate of Embodiment Example 1.

Described below is a circularly polarizing plate of Embodiment 1 of the first embodiment. FIG. 6 is a cross-sectional schematic drawing showing the circularly polarizing plate of Embodiment 1.

An anti-reflective film 114, which has a moth eye structure, a linear polarizer 111, a birefringent layer 112, and a λ/4 plate 113 were laminated in the order as shown in FIG. 6 to construct the circularly polarizing plate (circularly polarizing optical film) of Embodiment 1. The optical parameters, such as the axis angle and retardation value, of each film are shown in the figure. The direction of the absorption axis of the linear polarizer 111 was chosen to be at a 0° azimuth angle.

Figure 7:
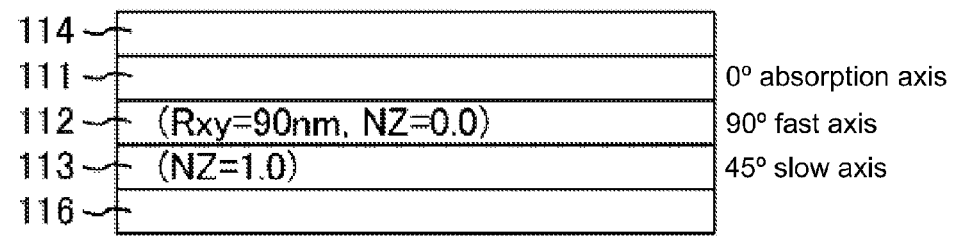
FIG. 7 is a cross-sectional schematic drawing showing the circularly polarizing plate of Embodiment Example 1 placed on an anti-reflective plate.

The anti-reflective mechanism of the circularly polarizing optical film of Embodiment 1 is described using the Poincare sphere. FIG. 7 is a schematic cross-sectional drawing showing the circularly polarizing plate of Embodiment 1 placed on an anti-reflective plate. FIG. 8 is a cross-sectional schematic drawing showing an optically equivalent structure to that of FIG. 7.

The concept based on the Poincare sphere is widely known in the field of crystal optics, for example, as a useful method for tracking the changing polarization states through the birefringent layer (see, for example, *Crystal Optics*, 1975, authored by Hiroshi Takasaki, Morikita Publication, pages 146 to 163). In the Poincare sphere, the upper hemisphere represents right-hand polarization, while the lower hemisphere represents left hand polarization. The equator represents linear polarization, while the upper and lower poles represent right circular polarization and left circular polarization, respectively. Two polarization states which are in a symmetrical relationship across the center of the sphere, form a pair of orthogonal polarizations, because they have opposite polarities and equal absolute value for the ellipticity angles. Furthermore, the effect of a birefringent layer on the Poincare sphere is a conversion by an anti-clockwise revolution from a point, which represents the polarization state immediately before a transmission through the birefringent layer, by an angle determined by (2π)×(retardation)/(wavelength) (unit: rad), centered around the slow axis on the Poincare sphere (in other words, the location of the point representing the polarization state of the slower eigenmode of oscillation of the birefringent layer), to another point. (This is equivalent to a clockwise revolution centering around the fast axis). The center of revolution and the angle of revolution, when the observation is made from an oblique direction, are determined by the slow axis and the retardation at that view angle. While detailed descriptions are not to be provided, they are calculated by solving the Fresnel equation for wavefront normal lines to find the oscillation directions and wave number vectors of the eigenmodes of oscillation of the birefringent layer, for example. The slow axis, when the observation is made from an oblique direction, is dependent on the angle of observation and the NZ coefficient defined as (nx−nz)/(nx−ny), or the biaxial parameter ΔNZ1, as defined earlier or ΔNZ2, to be described later. The retardation, when the observation is made from an oblique direction, is dependent on the angle of observation, biaxial parameters ΔNZ1 and ΔNZ2, in-plane retardation Rxy, and out-of-plane retardation Rxz.

Although it would be desirable to describe the changes in the polarization states of the reflected light in the configuration in FIG. 7 (showing the circularly polarizing plate of Embodiment 1 placed on a reflective plate 116), using the Poincare sphere, this effect, including the reflection at the reflective plate, is difficult to explain. Accordingly, it will be explained with an exploration of the changes in the polarization states of the transmitted light in a structure of FIG. 8 instead, which is optically equivalent to the structure shown in FIG. 7. In other words, as shown in FIG. 8, the explanation will be provided for the structure shown in FIG. 8, in which an anti-reflective film 114a, which has a moth eye structure, linear polarizer 111a, birefringent layer 112a, λ/4 plate 113a, λ/4 plate 113b, birefringent layer 112b, linear polarizer 111b, and anti-reflective film 114b, which has the moth eye structure, are laminated in this order. The optical parameters, such as the axis angle and retardation, of each film are shown in the figure. The direction of absorption axes of the linear polarizers 111a and 111b are set to be at 0° of azimuth angles.

Here, observations made on the circularly polarizing plate in FIG. 8 from the front direction (normal direction) and observations from a direction inclined from the normal direction by 60° (which may also be referred to as "60° inclination" henceforth) forming a 45° azimuth angle (may also be referred to as "45° azimuth" henceforth) from the absorption axis orientation of the polarizer 111, are considered. FIG. 9 is a drawing with the change in the polarization states in the circularly polarizing plate in FIG. 8, which are projected on the S1-S2 plane in the Poincare sphere. FIG. 9(a) is a drawing for an observation made from the front direction (normal direction). FIG. 9(b) is a drawing for an observation made from an oblique direction (45° azimuth and 60° inclination direction). In FIG. 9, E represents the extinction point of the upper polarizer (linear polarizer 111a), P0 represents the polarization state immediately after a transmission through the lower polarizer (linear polarizer 111b), B(fast) represents the fast axis of the birefringent layers 112a and 112b, B(slow) represents the slow axis of the birefringent layers 112a and 112b, and Q(slow) represents the slow axis of the λ/4 plates 113a and 113b.

With an observation from the normal direction, as shown in FIG. 9(a), the polarization state does not change at all even after a transmission through the lower birefringent layer 112b, because P0 and B (slow) overlap. Then, as a result of a transmission through the λ/4 plate 113b, P0 is converted by a one-quarter anti-clockwise revolution centered around (a line connecting the origin to) Q (slow) to P1 (circular polarization). Then, as a result of a transmission once more through the upper λ/4 plate 113a, P1 is converted to P2 (linear polarization). Then nothing happens in the upper birefringent layer 112a, and the polarizing state remains unchanged at P2. Because P2 matches the extinction point E in the upper polarizer (linear polarizer 111a), the light does not transmit through. In other words, the anti-reflective effect is achieved with the observation made from the normal direction.

With the observation made from the 45° azimuth and 60° inclination, as shown in FIG. 9(b), P0 goes through a rotation by a specific angle centered around B (slow) and arrives at P1 as a result of a transmission through the lower birefringent layer 112b. Next, it converts to P2 (circular polarization) as a result of a transmission through the λ/4 plate 113b. Then, the polarization state changes from P2 to P3 with another transmission through the upper λ/4 plate 113a, and, finally, P3 changes to P4 (linear polarization) as a result of a transmission through the upper birefringent layer 112a. Because P4 matches almost exactly to the extinction point of the upper polarizer (linear polarizer 111a), the anti-reflective effect is obtained also with the observation from this oblique view angle.

Figure 10:
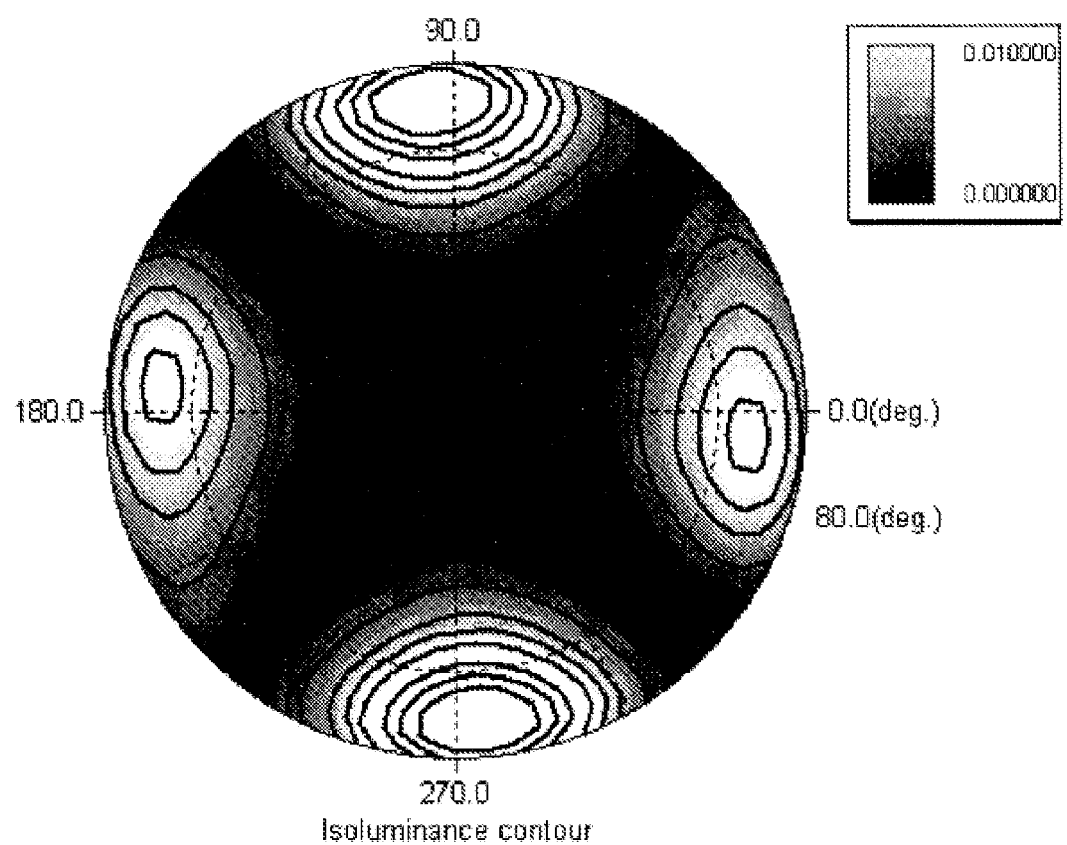
FIG. 10 shows the reflectance of the circularly polarizing plate of Embodiment Example 1 calculated by simulation.

The reflectance of the circularly polarizing film of Embodiment 1 was calculated by computer simulation, and the results will be described. Specifically, the regular reflectance from all directions was calculated for the circularly polarizing plate of Embodiment 1 placed on a reflective plate. Here, the simulation in the present specification was made under a condition that the reflectance of the reflective plate is set at 1. If the reflectance is calculated under this condition for a glass plate having a refractive index of 1.5 placed on the reflective plate, the calculated reflectance would be approximately 0.92 (92%). Furthermore, in the simulation in the present specification, the surface reflectance of the anti-reflective film having the moth eye structure was set at 0%. FIG. 10 shows the reflectance of the circularly polarizing plate of Embodiment 1, which was calculated by the simulation. As shown in FIG. 10, it was found that the anti-reflective effect can be obtained across a wide view angle, not only from the normal direction with the present embodiment.

Furthermore, the circularly polarizing plate of Embodiment 1 was actually manufactured and placed on a minor having aluminum vapor deposited thereon to verify the anti-reflective effects. The anti-reflective effect was obtained across a wide view angle similar to the simulation results.

The preferred range of NZ coefficient for the λ/4 plate 113 for the circularly polarizing plate of Embodiment 1, using modified examples of Embodiment 1 in which the NZ coefficient of the λ/4 plate 113 is modified, was examined, and the results are described below. Here, the preferred in-plane retardation Rxy for the λ/4 plate 113 is not explored. This is because the highest priority for the circularly polarizing plate of the present invention is the anti-reflective effect under an observation from the normal direction—i.e., the functionality as the circularly polarizing plate. Its most preferred value is automatically determined to be essentially a quarter wavelength of the light having a wavelength of 550 nm (137.5 nm precisely, but acceptable if larger than 115 nm and smaller than 160 nm). Specifically, the preferred range of the NZ coefficient for the λ/4 plate 113 was examined with the steps (1) through (5) below. Furthermore, the combination of optimal values for NZ and Rxy for the birefringent layer 112 was obtained from the aforementioned Table 1, and Table 2 below shows the optimal value combinations used for the exposition below.

TABLE 2

| NZ   | \|Rxy\| (nm) |
|------|--------------|
| 0.0  | 90           |
| −0.5 | 75           |
| −1.8 | 55           |
| −3.0 | 45           |

Step (1)

The birefringent layer 112 is set at NZ=0 and Rxy=90 nm (reference design values for the birefringent layer 112 are set).

Step (2)

The reflectance view angle characteristics are calculated with the NZ coefficient of the λ/4 plate 113 being changed from 0.8 to 2.0.

Step (3)

The preferred range of NZ coefficients for the λ/4 plate 113 is determined based on the calculation results. (Here, the determination was made through a comparison against the comparison example 1 to be described later. The details will be described later.)

Step (4)

Even when the range of NZ coefficients does not appear to be preferable, a possible improvement in the view angle characteristics by adding another layer of the birefringent layer (positive C plate) is examined.

Step (5)

Step (1) through step (4) are repeated with the type of the birefringent layer 112 changing to NZ=−0.5/Rxy=75 nm to NZ=−1.8/Rxy=55 nm, NZ=−3.0/Rxy=45 nm.

Figure 11:
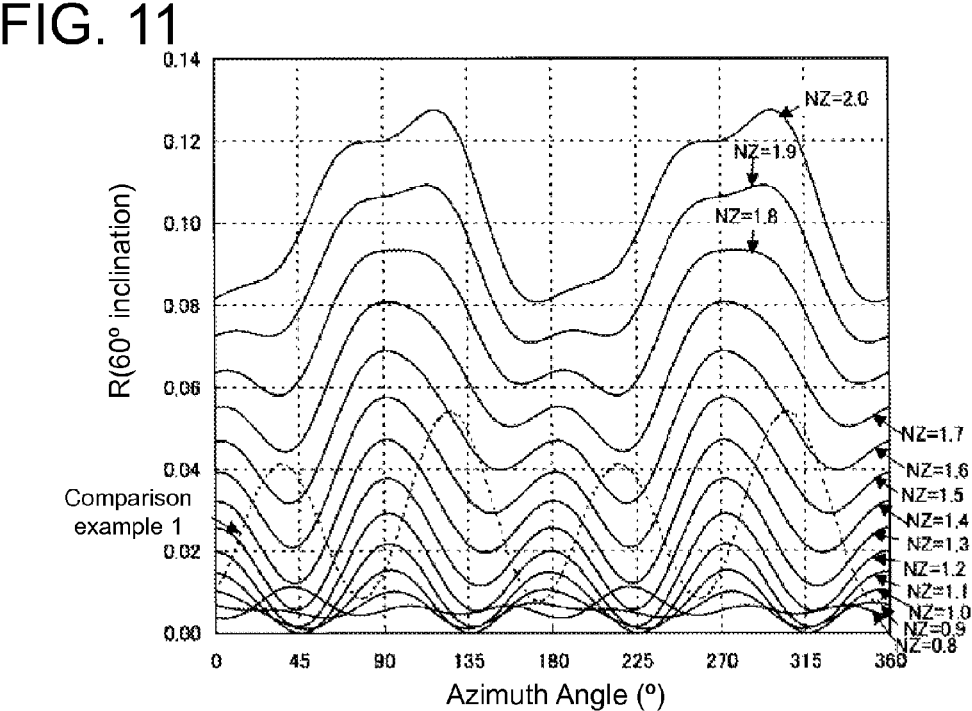
FIG. 11 is a graph showing the calculated results on the reflectance of a modified example of the circularly polarizing plate of Embodiment Example 1, in which the NZ coefficient of the $\lambda/4$ plate is changed between 0.8 and 2.0.
Figure 12:
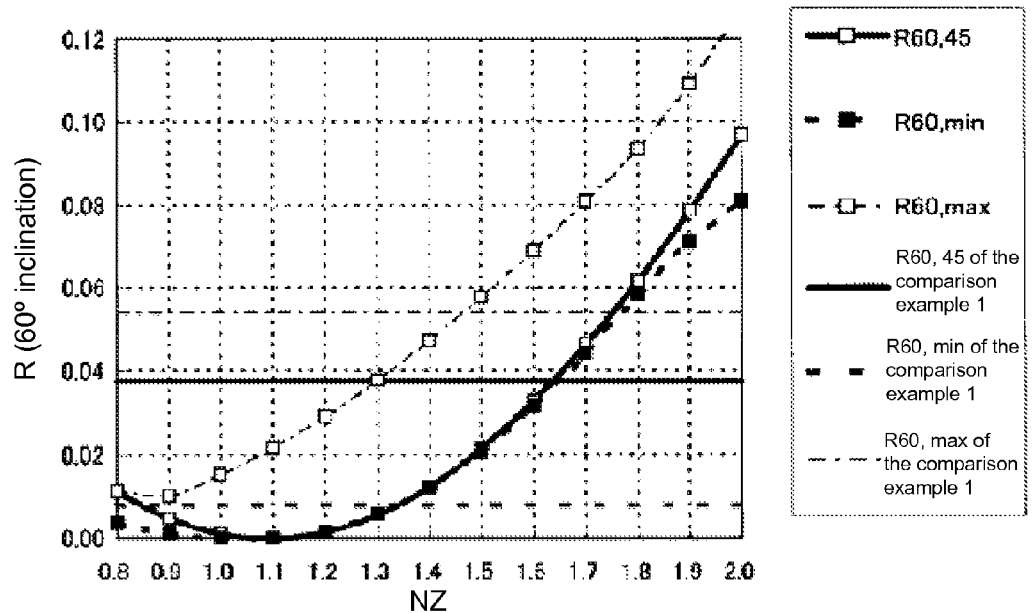
FIG. 12 is a graph showing the dependence on the $\lambda/4$ plate NZ coefficient of the reflectance R60, 45 at the 60° inclination and 45° azimuth, maximum reflectance R60, max at the 60° inclination, and minimum reflectance R60, min at the 60° inclination in a modified example (NZ=0 and Rxy=90 nm in the birefringent layer) of the circularly polarizing plate of Embodiment Example 1.

FIG. 11 is a graph showing the calculated results on the reflectance of the circularly polarizing plate of Embodiment 1 in the modified examples, in which the NZ coefficient of the λ/4 plate is changed from 0.8 to 2.0. Here, the direction of observation is fixed at the 60° inclination, and the reflectance dependence on the azimuth angle is calculated. Furthermore, the maximum reflectance R60, max at the 60° inclination, the minimum reflectance R60, min at the 60° inclination, and the reflectance R60, 45 at the 60° inclination and 45° azimuth are extracted and shown in FIG. 12 as representative data, because they are difficult to identify in FIG. 11. In other words, FIG. 12 is a graph showing the λ/4 plate NZ coefficient dependence of the maximum reflectance R60, max at the 60° inclination, the minimum reflectance R60, min at the 60° inclination, and the reflectance R60, 45 at the 60° inclination and 45° azimuth in the modified examples (NZ=0, Rxy=90 nm for the birefringent layer) of the circularly polarizing plate of Embodiment 1. Here, FIG. 12 also shows the calculated results on the circularly polarizing plate of the comparison example 1 (details to be described later) having a conventional structure, in which the anti-reflective film with the moth eye structure, linear polarizer, and λ/4 plate are laminated.

The following characteristics have been identified in FIG. 12:

Reflectance at the 45° azimuth (reference angle for designing) is smallest, when NZ=1.1.

Comparisons of the maximum reflectance R60, max values across all directions show that NZ=0.9 is the optimal value.

Focusing on these characteristics, the circularly polarizing plate of Embodiment 1 (an example in which a regular, uniaxial λ/4 plate of NZ=1.0 is used as the λ/4 plate 113), shown in FIG. 6, essentially achieves the optimal value for the first embodiment.

Among these modified examples, a higher performance than the comparison example 1 is achieved in a range of NZ≦1.4. Furthermore, when the NZ coefficient exceeds 1.4 (when it is 1.5 or greater), the characteristics become inferior to the comparison example 1.

Here, determination as to whether or not the characteristics of these modified examples were inferior or not to the comparison example 1 was made based on whether or not the reflectance R60, 45 and the maximum reflectance R60, max were both lower than those of the comparison example 1.

Figure 13:
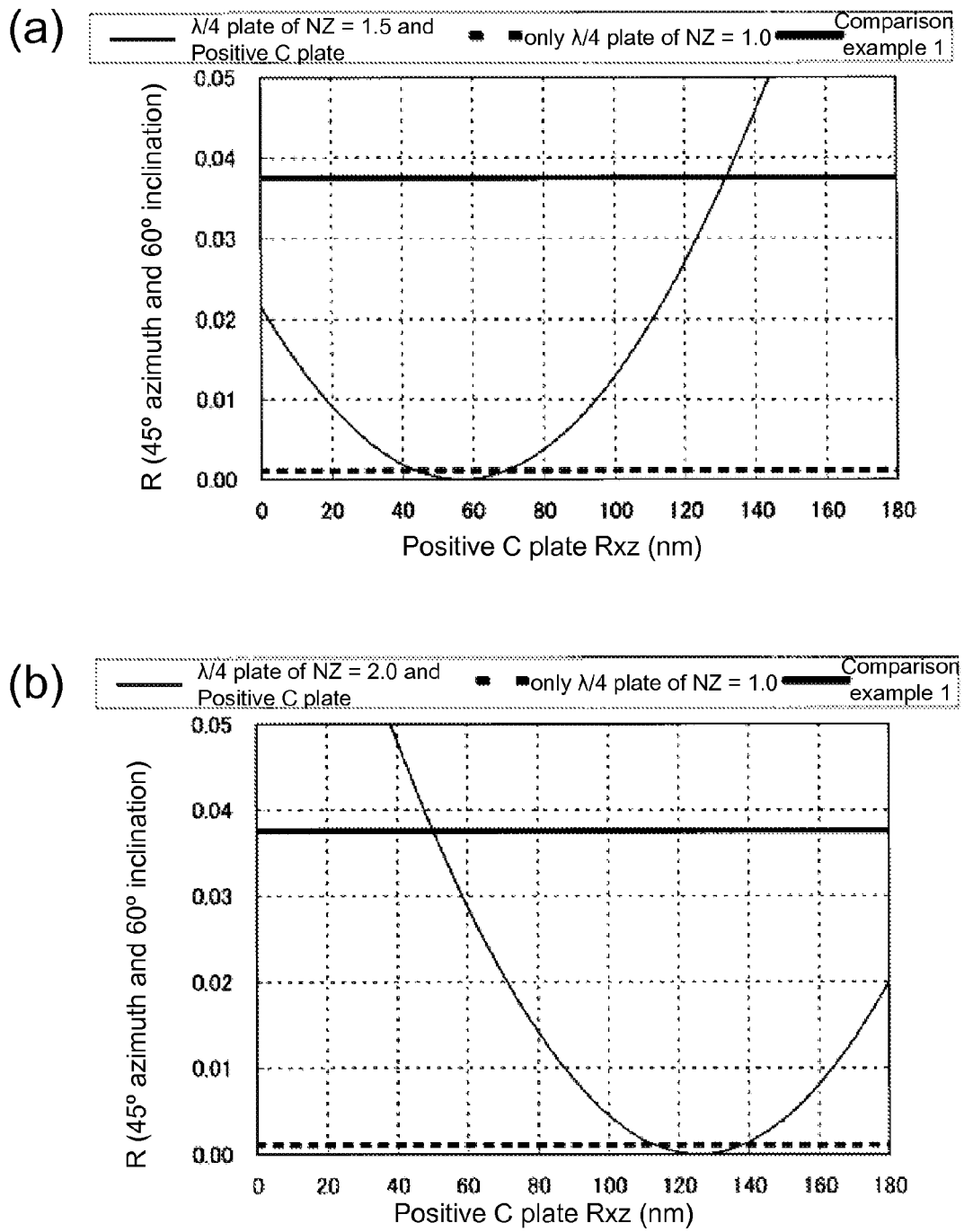
FIG. 13 is a graph showing the calculated results on the reflectance at the 60° inclination and 45° azimuth, with the out-of-plane retardation Rxz of the positive C plate being changed.

However, even when the NZ coefficient exceeds 1.4 (1.5 or greater), the reflectance may possibly be reduced, when the positive C plate is inserted underneath the λ/4 plate 113 (reflective plate side). Here, the calculated results on the reflectance at the 60° inclination and 45° azimuth, as the out-of-plane retardation Rxz of the positive C plate is being changed, are shown in FIG. 13, for the examples of the λ/4 plate 113 having the NZ=1.5 and NZ=2.0. The principles involved here are described later. As shown in FIG. 13(a), performance almost comparable to when NZ=1.0 was obtained in a range of 40 to 70 nm for the out-of-plane retardation Rxz of the positive C plate, when the λ/4 plate 113 had NZ=1.5. Furthermore, as shown in FIG. 13(b), performance almost comparable to the instance of NZ=1.0 was obtained across a range of 110-140 nm, when the λ/4 plate 113 had NZ=2.0.

Figure 14:
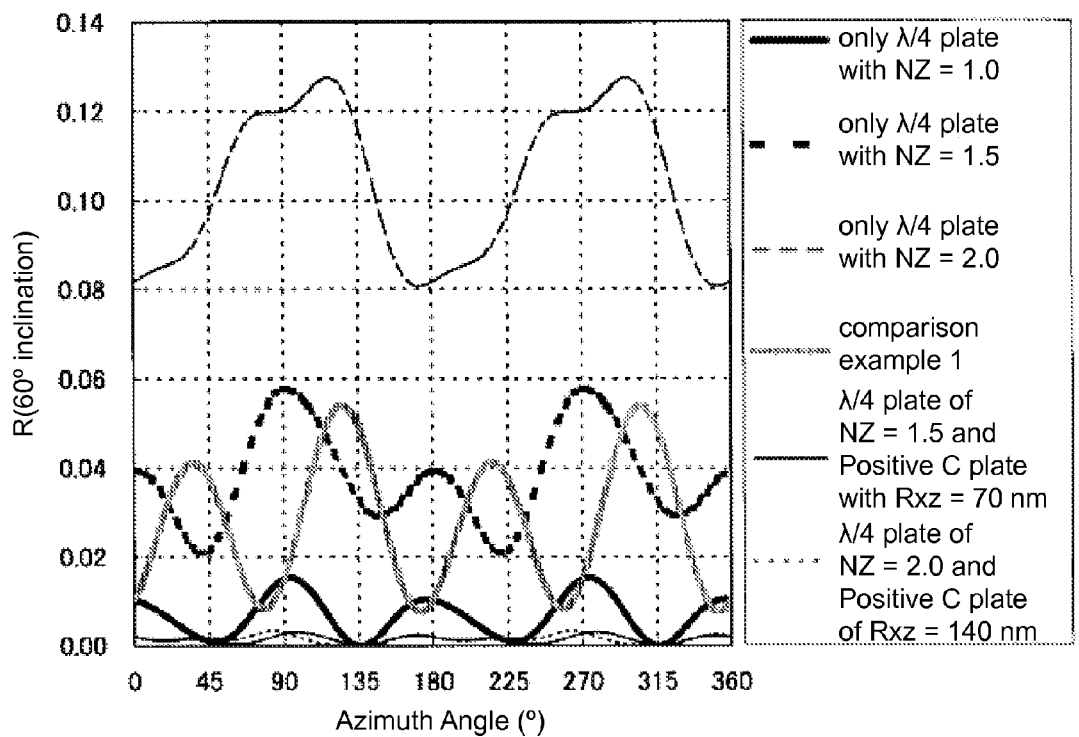
FIG. 14 shows the calculated results on the reflectance obtained by simulation on a modified example of Embodiment Example 1 into which a positive C plate is inserted.

FIG. 14 shows the calculated results on the reflectance obtained by simulation on the modified examples of Embodiment 1 in which the positive C plate was inserted. Here, the out-of-plane retardation Rxz was 70 nm for the positive C plate when the λ/4 plate 113 had NZ=1.5, and the out-of-plane retardation Rxz was 140 nm for the positive C plate when the λ/4 plate 113 had NZ=2.0, and the view angle characteristics (characteristics in the directions including those other than the aforementioned nominal angle, i.e., at the 60° inclination and all azimuth angles) were calculated. Furthermore, FIG. 14 also shows the results when the positive C plate was not inserted with the λ/4 plate 113 having the NZ coefficients of NZ=1.0, NZ=1.5, and NZ=2.0, as references. As a result, as shown in FIG. 14, it was found that the modified example that included the λ/4 plate 113 of NZ=1.5 and the positive C plate of Rxz=70 nm, and the modified example that included the λ/4 plate 113 of NZ=2.0 and the positive C plate of Rxz =140 nm had higher performance than the comparison example 1 and, furthermore, had characteristics comparable or better than the example (an example of the standard design) of Embodiment 1 that included the λ/4 plate 113 of NZ=1.0 and no positive C plate.

Figure 15:
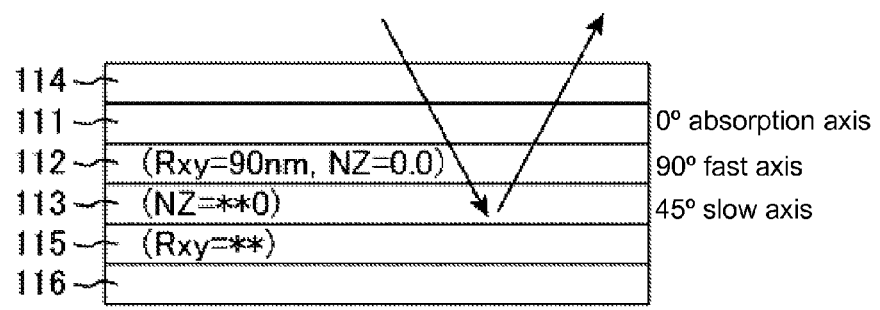
FIG. 15 is a cross-sectional schematic drawing showing a modified example of the circularly polarizing plate of Embodiment Example 1 placed on the anti-reflective plate.
Figure 16:
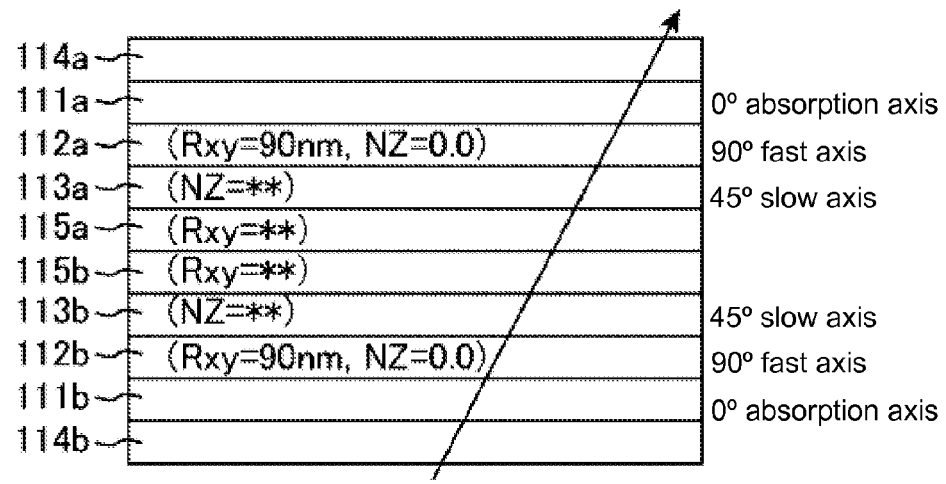
FIG. 16 is a cross-sectional schematic drawing showing a structure optically equivalent to that of FIG. 15.

The reason for the reflectance decrease with the insertion of the positive C plate underneath (reflective plate side) of the λ/4 plate 113 even when the NZ coefficient exceeds 1.4 (1.5 or greater) will be described. FIG. 15 is a cross-sectional schematic drawing showing a modified example of the circularly polarizing plate of Embodiment 1 placed on the reflective plate. FIG. 16 is a cross-sectional schematic drawing showing an optically equivalent configuration to the structure of FIG. 15.

As shown in FIG. 15, the present modified example is a circularly polarizing plate in which an anti-reflective film 114, which has a moth eye structure, linear polarizer 111, birefringent layer 112, λ/4 plate 113, and positive C plate 115 are laminated in this order and placed on a reflective plate 116. The optical parameters of each film, including the axis angle, retardation value, or the like, are shown in the figure. The absorption axis of the linear polarizer 111 is set to be at the azimuth angle of 0°.

Although it would be desirable to explain the changes in the polarization states of the reflected light in the configuration in FIG. 15 using the Poincare sphere, it is difficult to explain this effect when the reflection at the reflection plate is included. Accordingly, the explanation will be provided by describing the changes in the polarization states of the transmitted light in the structure in FIG. 16 instead, which is optically equivalent to the structure shown in FIG. 15. In other words, as shown in FIG. 16, an explanation will be provided for a structure in which the anti-reflective film 114a, having a moth eye structure, linear polarizer 111a, birefringent layer 112a, λ/4 plate 113a, positive C plate 115a, positive C plate 115b, λ/4 plate 113b, birefringent layer 112b, linear polarizer 111b, and anti-reflective film 114b, having the moth eye structure, are laminated in this order. The optical parameters of each film, including the axis angle, retardation value, or the like, are shown in the figure. The absorption axis direction of the linear polarizers 111a and 111b is set to be at the 0° azimuth.

Figure 17:
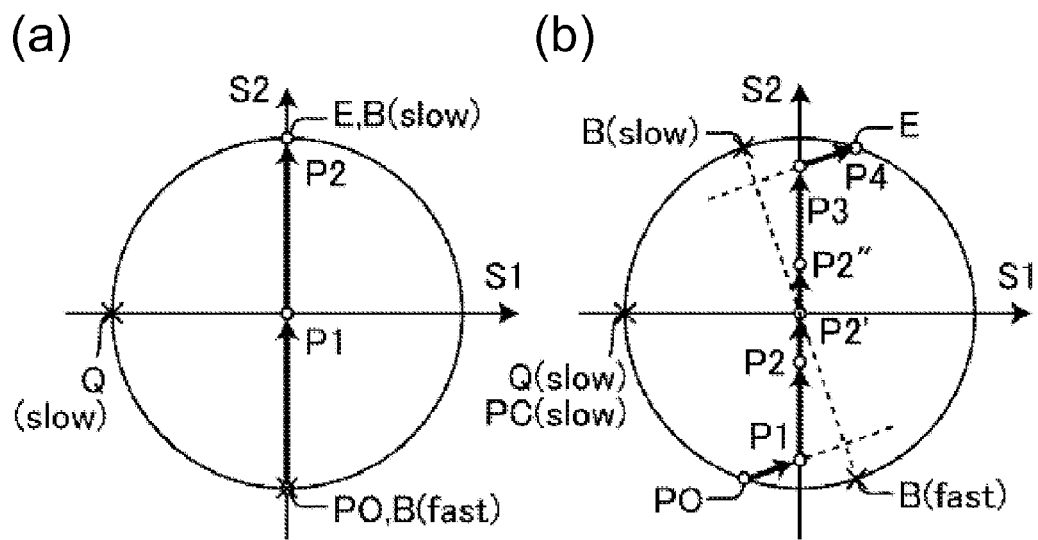
FIG. 17 is a drawing showing the changes in the polarization states in the circularly polarizing plate in FIG. 16 which are projected onto the S1-S2 plane of the Poincare sphere.

Here, furthermore, an observation made on the circularly polarizing plate in FIG. 16 from the front direction (normal direction) and an observation made from the 45° azimuth and 60° inclination are considered. FIG. 17 is a drawing of the changes in the polarization states in the circularly polarizing plate of FIG. 16 that are projected onto the S1-S2 plane of the Poincare sphere. FIG. 17(a) is a drawing for an observation made from the front direction (normal direction), while FIG. 17(b) is a drawing for an observation made from an oblique direction with the 45° azimuth and 60° inclination. Here, in FIG. 17, E represents the extinction point in the upper polarizer (linear polarizer 111a), P0 represents the polarization state immediately after a transmission through the lower polarizer (linear polarizer 111b), B(fast) represents the fast axis of the birefringent layers 112a and 112b, B(slow) represents the slow axis of the birefringent layers 112a and 112b, Q(slow) represents the slow axis of the λ/4 plates 113a and 113b, and PC (slow) represents the slow axis of the positive C plates 115a and 115b.

With observed from the normal direction, as shown in FIG. 17(a), P0 and B (slow) are overlapped, and the polarization state does not change at all even after a transmission through the lower birefringent layer 112b. Then, as a result of a transmission through the λ/4 plate 113b, P0 transitions to P1 (circular polarization) with a one quarter revolution anti-clockwise around (a line connecting the origin and) Q (slow). Because the positive C plates 115a and 115b are optically isotropic, when the observation is made from the normal direction, P1 (circularly polarized light) does not change even after a subsequent transmission through the positive C plates 115a and 115b. Then, with another transmission through the upper λ/4 plate 113a, P1 transitions to P2 (linearly polarized light). Then, since nothing happens in the upper birefringent layer 112a, the polarization state does not change and remains at P2. Because P2 matches the point E, which is the extinction point of the upper polarizer (linear polarizer 111a), the light does not transmit through. In other words, the anti-reflective effect takes place for the observation made from the normal direction.

With observed from the 45° azimuth and 60° inclination, as shown in FIG. 17(b), the amount of transitions at the λ/4 plates 113a and 113b (P1 to P2 and P2″ to P3) are smaller, because the effective retardation, when observed from the direction of 45° azimuth and 60° inclination on the λ/4 plate of NZ>1.0, is smaller than when NZ=1.0 (quantitative evaluation to be described later). Here, when the positive C plates 115a and 115b are inserted, it is possible to make up for the retardations in the λ/4 plates 113a and 113b that decrease with NZ>1.0, with a selection of an appropriate out-of-plane retardation value Rxz, because the slow axis direction of the positive C plates 115a and 115b is the same as that of the λ/4 plate at the aforementioned angle of observation. In other words, an anti-reflective effect, similar in the end to NZ=1.0, can be obtained, because the transition effects of P2 to P2′ (circularly polarized light) and P2′ (circularly polarized light) to P2″ are obtained with the positive C plates 115a and 115b, and a smaller transition, compared with when NZ=1.0, is obtained again with the λ/4 plate 113a (P2″ to P3), and finally, the transition from P3 to P4 (linearly polarized light) is obtained as a result of a transmission through the upper birefringent layer 112a.

Figure 18:
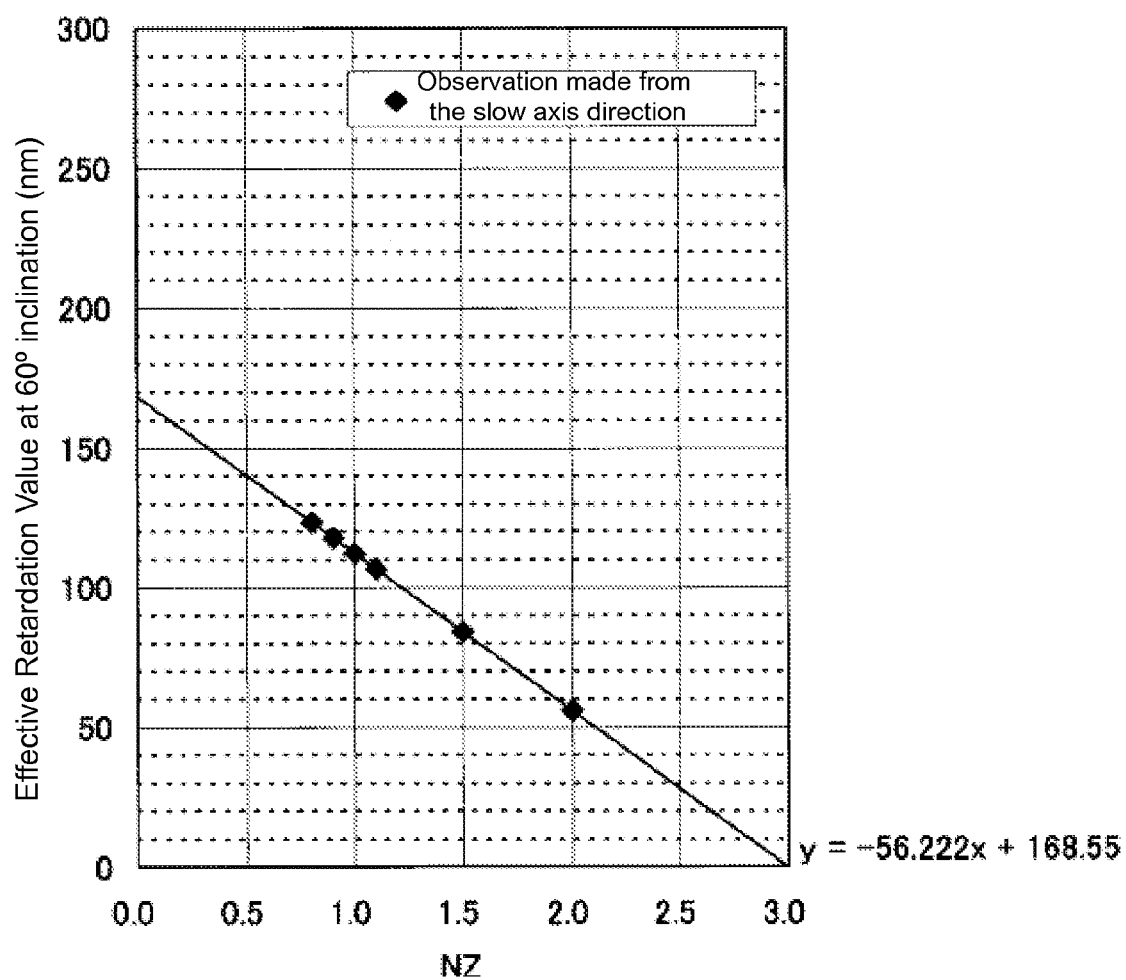
FIG. 18 shows an NZ coefficient dependence of the effective retardation value of the λ/4 plate in the 60° inclination direction.

FIG. 18 shows the NZ coefficient dependence of the effective retardation values in the 60° inclination direction of the λ/4 plate. Shown here are the calculated results on the effective retardation values of a λ/4 plate having the in-plane retardation Rxy=137.5 nm, when the observation is made with a 60° tilt angle (60° inclination) toward the direction of the slow axis of the λ/4 plate. As shown in FIG. 18, for example, the effective retardation value is 84.2 nm, when NZ=1.5, and is 28.1 nm smaller, compared with the effective retardation value of 112.3 nm, when NZ is 1.0. Furthermore, the effective retardation value is 56.1 nm, when NZ is 2.0, and is 55.9 nm smaller compared with the effective retardation value for the instance in which NZ is 1.0. Furthermore, it has been found from another calculation result (not shown in the figure) that the effective retardation of a positive C plate of |Rxz|=1 nm is 0.407 nm, when the observation is made on the positive C plate from the 60° inclination.

It is predicted that a retardation of 69 nm (approximately equal to 28.1/0.407) would be required, if a positive C plate were to be used for making up the 28.1 nm shortage resulting from NZ=1.5. This matches the previous calculated results that showed that a modified example that includes the λ/4 plate 113 of NZ=1.5 and the positive C plate of Rxz=70 nm possessed characteristics which are equivalent or better than an example of Embodiment 1 (standard design example) that included the λ/4 plate 113 of NZ=1.0 and no positive C plate.

Furthermore, it is predicted that a retardation of 137.3 nm (approximately equal to 55.9/0.407), would be required, if a positive C plate were to be used for making up for the 55.9 nm shortage resulting from NZ being 2.0. This matches the previous calculated results that showed that a modified example that included the λ/4 plate 113 of NZ=2.0 and the positive C plate of Rxz=140 nm possessed characteristics which are equivalent or better than an example of Embodiment 1 (standard design example) that included the λ/4 plate 113 of NZ=1.0 and no positive C plate.

Figure 19:
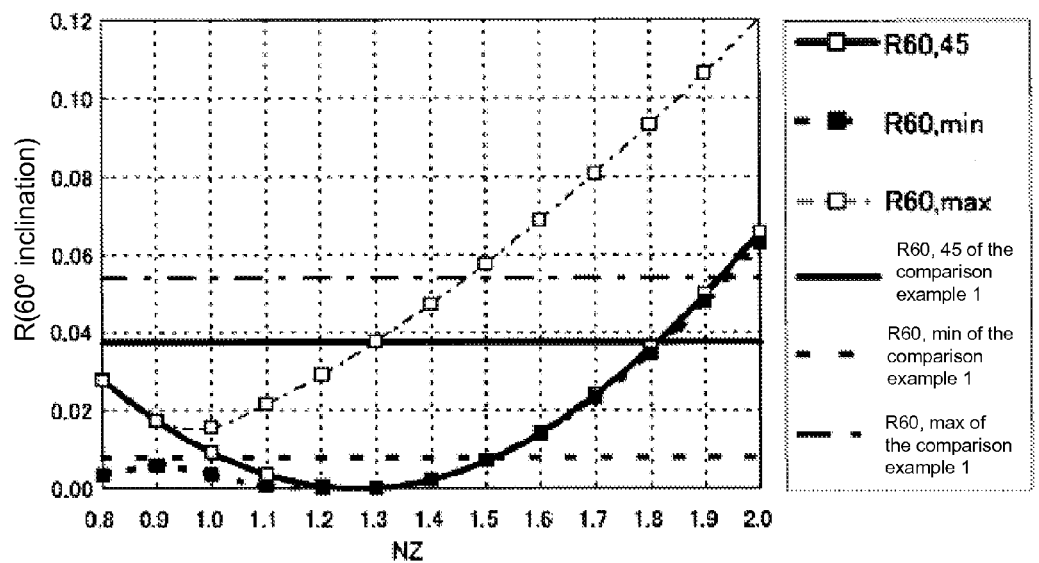
FIG. 19 is a graph showing the dependence on the λ/4 plate NZ coefficient of the reflectance R60, 45 at the 60° inclination and 45° azimuth, maximum reflectance R60, max at the 60° inclination, and minimum reflectance R60, min at the 60° inclination for a modified example (NZ=−0.5 and Rxy=75 nm in the birefringent layer) of the circularly polarizing plate of Embodiment Example 1.
Figure 20:
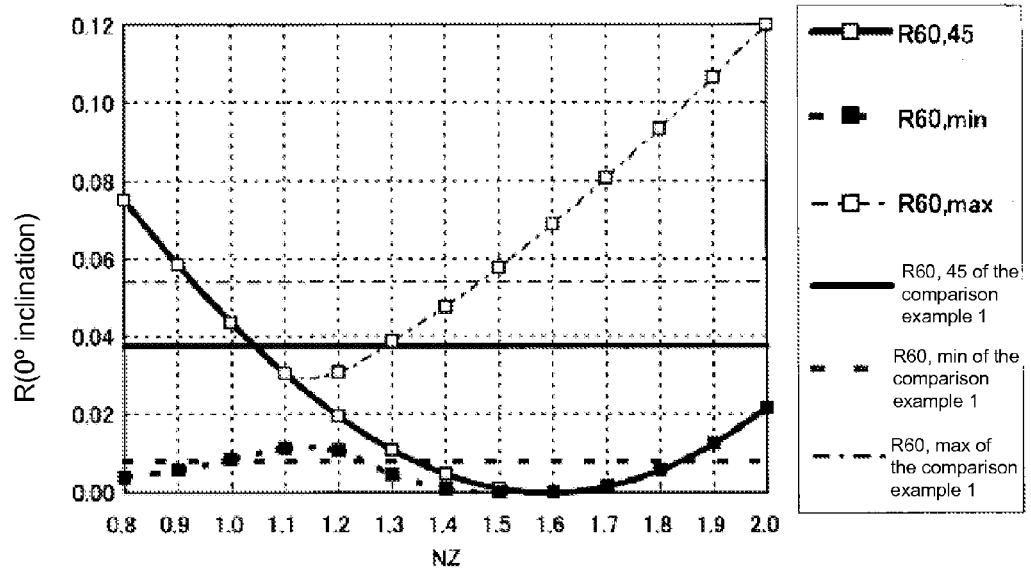
FIG. 20 is a graph showing the dependence on the λ/4 plate NZ coefficient of the reflectance R60, 45 at the 60° inclination and 45° azimuth, maximum reflectance R60, max at the 60° inclination, and minimum reflectance R60, min at the 60° inclination for a modified example (NZ=−1.8 and Rxy=55 nm in the birefringent layer) of the circularly polarizing plate of Embodiment Example 1.
Figure 21:
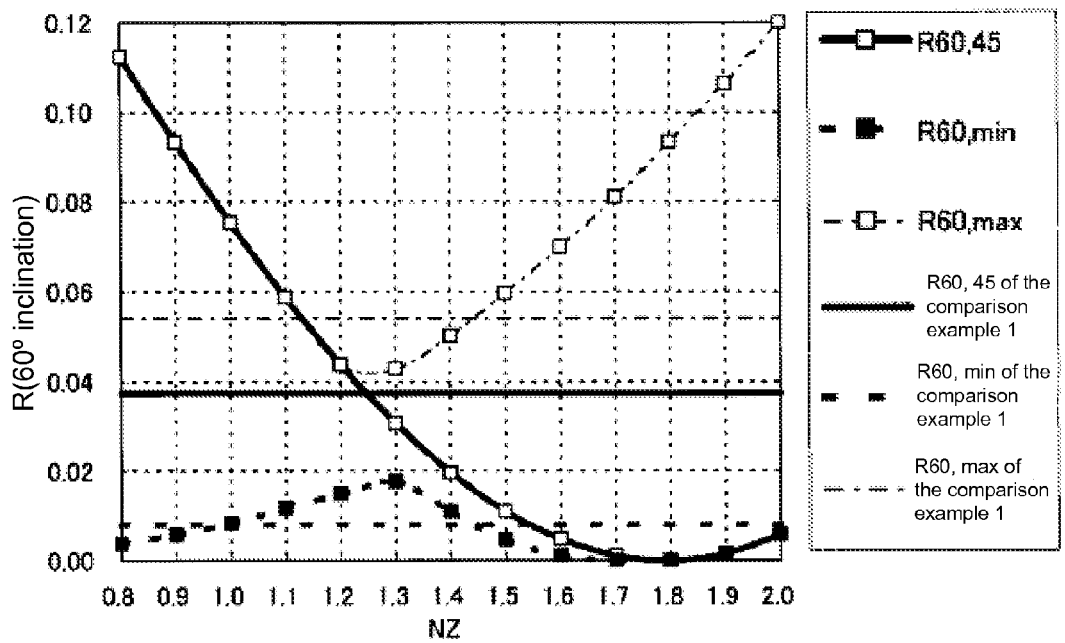
FIG. 21 is a graph showing the dependence on the λ/4 plate NZ coefficient of the reflectance R60, 45 at the 60° inclination and 45° azimuth, maximum reflectance R60, max at the 60° inclination, and minimum reflectance R60, min at the 60° inclination in a modified example (NZ=−3.0 and Rxy=45 nm in the birefringent layer) of the circularly polarizing plate of Embodiment Example 1.

Similar calculated results are shown when the type of birefringent layer 112 is changed to NZ=−0.5 and Rxy=75 nm, NZ=−1.8 and Rxy=55 nm, and to NZ=−3.0 and Rxy=45 nm. FIG. 19 is a graph showing the λ/4 plate NZ coefficient dependence of the reflectance R60, 45 at the 60° inclination and 45° azimuth, maximum reflectance R60, max at the 60° inclination, and minimum reflectance R60, min at the 60° inclination, in the modified example (NZ=−0.5 and Rxy=75 nm for the birefringent layer) of the circularly polarizing plate of Embodiment 1. FIG. 20 is a graph showing the λ/4 plate NZ coefficient dependence of the reflectance R60, 45 at the 60° inclination and 45° azimuth, maximum reflectance R60, max at the 60° inclination, and minimum reflectance R60, min at the 60° inclination, in the modified example (NZ=−1.8 and Rxy=55 nm in the birefringent layer) of the circularly polarizing plate of Embodiment 1. FIG. 21 is a graph showing the λ/4 plate NZ coefficient dependence of the reflectance R60, 45 at the 60° inclination and 45° azimuth, maximum reflectance R60, max at the 60° inclination, and minimum reflectance R60, min at the 60° inclination in the modified example (NZ=−3.0 and Rxy=45 nm in the birefringent layer) of the circularly polarizing plate of Embodiment 1. Here, FIGS. 19 to 21 also show the calculated results on the circularly polarizing plate of the comparison example 1 (details to be described later), which has a conventional laminated structure of an anti-reflective film with a moth eye structure, a linear polarizer, and a λ/4 plate.

Table 3 below shows what are considered to be the optimal NZ, which are ranges in which both the reflectance R60, 45 and the maximum reflectance R60, max are lower than those of the comparison example 1. Here, the calculations were made starting at a NZ coefficient lower limit of 0.8, but it is difficult to manufacture a birefringent layer of NZ=0.8. For this reason, NZ=0.8 is excluded from the optimal values in the present invention.

TABLE 3

| NZ | \|Rxy\| (nm) | λ/4 optimal NZ |
|---|---|---|
| 0.0 | 90 | 0.9-1.4 |
| −0.5 | 75 | 0.9-1.4 |
| −1.8 | 55 | 1.1-1.4 |
| −3.0 | 45 | 1.3-1.4 |

As thus shown, it was found that the lower limit value for the optimal NZ coefficient changes slightly depending on the NZ coefficient and in-plane retardation Rxy of the birefringent layer 112. The optimal upper value for the NZ coefficient, however, is NZ=1.4, regardless of the NZ coefficient and in-plane retardation Rxy of the birefringent layer 112.

Embodiment 2

Figure 22:
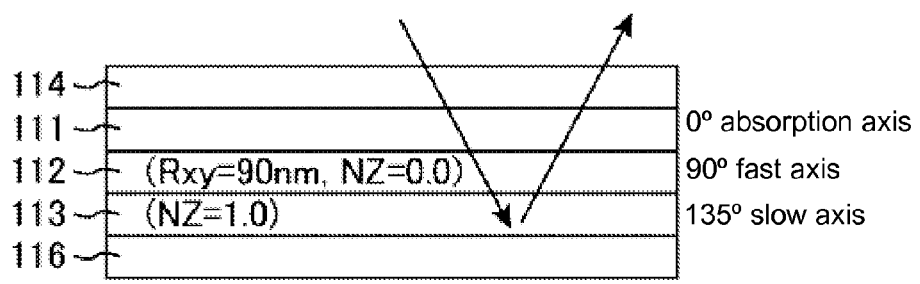
FIG. 22 is a cross-sectional schematic drawing showing the circularly polarizing plate of Embodiment 2 placed on an anti-reflective plate.
Figure 23:
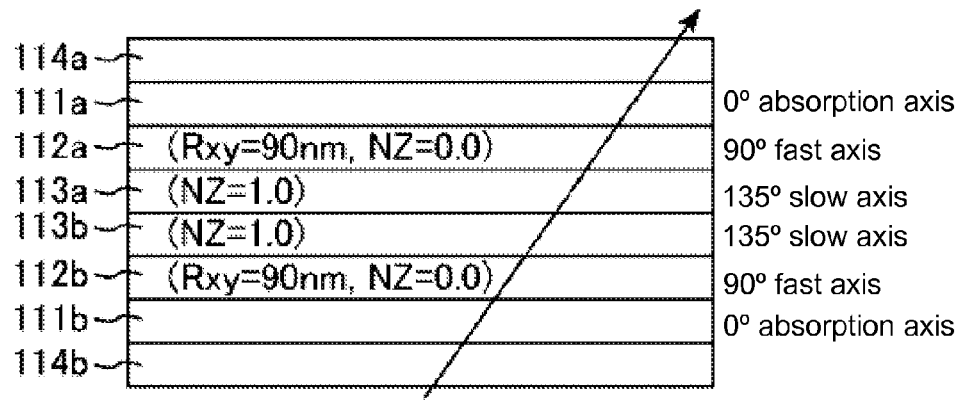
FIG. 23 is a cross-sectional schematic drawing showing a structure optically equivalent to that of FIG. 22.

Provided below is a description on a circularly polarizing plate of Embodiment 2 of the first embodiment. FIG. 22 is a cross-sectional schematic drawing showing a circularly polarizing plate of Embodiment 2 placed on a reflective plate. FIG. 23 is a cross-sectional schematic drawing showing an optically equivalent structure to that of FIG. 22. Optical parameters of each film, including the axis angle and retardation value, or the like, are shown in the figure. The absorption axis direction of the linear polarizer 111 is chosen to be at the 0° azimuth.

An anti-reflective film 114 having a moth eye structure, linear polarizer 111, birefringent layer 112, and λ/4 plate 113 are laminated in the order shown in FIG. 22 to construct the circularly polarizing plate (circularly polarizing film) of Embodiment 2. The circularly polarizing plate of Embodiment 2 is placed on a reflective plate 116. Furthermore, as shown in FIG. 22, the optically equivalent structure to FIG. 22 includes the anti-reflective film 114a having a moth eye structure, linear polarizer 111a, birefringent layer 112a, λ/4 plate 113a, λ/4 plate 113b, birefringent layer 112b, linear polarizer 111b, and anti-reflective film 114b having the moth eye structure, which are laminated in this order. Therefore, the anti-reflective effect is also achieved in the present embodiment, according to the concept based on the Poincare sphere similar to those of Embodiment 1, because Embodiment 2 and Embodiment 1 differ only in that the slow axis directions of the λ/4 plate 113 differ by 90°.

Second Embodiment

A circularly polarizing plate of the present embodiment includes an anti-reflective layer, polarizer, birefringent layer (also called birefringent layer C henceforth), and λ/4 plate (also called the λ/4 plate D henceforth), which are laminated in this order. The NZ coefficient of the birefringent layer C satisfies NZ>0.9, the in-plane slow axis of the birefringent layer C is orthogonal to the absorption axis of the polarizer, the NZ coefficient of the λ/4 plate D satisfies NZ<0.1, and the in-plane fast axis of the λ/4 plate D intersects with the absorption axis of the polarizer.

Accordingly, the circularly polarizing plate of the present embodiment has a similar structure as the circularly polarizing plate of the first embodiment, except that it includes the birefringent layer C and the λ/4 plate D. Descriptions overlapping with the circularly polarizing plate of the first embodiment are not provided in the description below.

Because the circularly polarizing plate of the present embodiment includes the polarizer and the λ/4 plate D the in-plane fast axis of which intersects the absorption axis of the polarizer, it functions as a so-called circularly polarizing plate and is able to achieve an anti-reflective effect.

Furthermore, because the circularly polarizing plate of the present embodiment includes the birefringent layer C having the in-plane slow axis orthogonal to the absorption axis of the polarizer, it is able to achieve the anti-reflective effect across a wide view angle.

Furthermore, because the NZ coefficient of the birefringent layer C satisfies NZ>0.9, and the NZ coefficient of the λ/4 plate D satisfies NZ<0.1, it can be manufacture with ease and at low cost using the conventional manufacturing method.

Furthermore, because the circularly polarizing plate of the present embodiment includes the anti-reflective layer, it can effectively achieve the anti-reflective effect across a wide view angle.

Each element of the present embodiment is described in further detail below. Although the various layers, which are laminated in the circularly polarizing plate of the present embodiment, may simply be placed on each other, they should preferably be laminated in a fixed state from the viewpoint of preventing shifts in the optical axes. Their lamination methods are not limited specifically, and an adhesion method with an adhesive agent or bonding agent with high transparency and other appropriate methods may be used, for example. The types of adhesive agent and bonding agent are not limited specifically, but they preferably are materials not showing any effective optical anisotropy. Furthermore, the adhesive agent and bonding agent preferably do not require a high temperature process of curing or drying and preferably do not require a long curing process or drying process from the viewpoint of preventing changes in the optical characteristics of the circularly polarizing plate.

Furthermore, it is preferred that other birefringent layers not be placed between the polarizer and the birefringent layer C and between the birefringent layer C and the λ/4 plate D, in order to effectively obtain the effects of the present invention. Accordingly, isotropic films (for example, protective film, or the like) may be placed, as appropriate, between the polarizer and the birefringent layer C and between the birefringent layer C and the λ/4 plate D.

Thus, the polarizer may be protected by a protective film, such as a TAC film. However, it is more preferable that the polarizer be supported by the anti-reflective layer and the birefringent layer C without such a protective film from the viewpoint of cost reduction and thickness reduction. In other words, the anti-reflective layer and the birefringent layer C may also function as the protective film for the polarizer.

When the NZ coefficient of the birefringent layer C is less than 1.0, manufacturing may be difficult in order to satisfy the relationship nx>nz>ny. On the other hand, in general, a birefringent layer satisfying 1.0≦NZ can be manufactured easily using a regular manufacturing method (for example, a horizontal uniaxial stretching, vertical-horizontal biaxial stretching, or the like). However, the manufacturing of the birefringent layer, satisfying $1.0 \leq NZ$, may unintentionally result in a birefringent layer of having a NZ of about 0.1 sometimes. Accordingly, those birefringent layers C satisfying NZ>0.9 are easy to manufacture.

The birefringent layer C preferably satisfies $1.1 \leq NZ \leq 4.0$ from the viewpoint of making the manufacturing of the birefringent layer C easier. This is because the birefringent layer satisfying $1.1 \leq NZ \leq 4.0$ can typically be manufactured by a generally available horizontal uniaxial stretching or vertical-horizontal biaxial stretching using a material having a positive intrinsic birefringence. For this reason, it is preferred that the birefringent layer C be made of a material having a positive intrinsic birefringence. Furthermore, it is also preferred that the birefringent layer C satisfying $1.1 \leq NZ \leq 4.0$ be manufactured with the aforementioned stretching methods from a material having the positive intrinsic birefringence, because the in-plane slow axis can be oriented in a direction 90° (orthogonal direction) relative to the length direction of a roll shaped retardation film, and roll-to-roll adhesion of the birefringent layer C and the polarizer becomes possible. The birefringent layer C may satisfy NZ>0.9, and the in-plane slow axis may be orthogonal to the absorption axis of the polarizer when the circularly polarizing plate is viewed from the normal direction.

Here, it is basically necessary that the in-plane slow axis of the birefringent layer C (optical axis of the birefringent layer C) and the absorption axis of the polarizer form a 90° angle, in order to achieve a high contrast ratio across a wide view angle, or in other words, to achieve the anti-reflective effect, without a reduction in the contrast ratio in the normal direction, as described above. This is because, similar to the first embodiment, (1) the birefringent layer C must not function in the normal direction, and (2) the birefringent layer C must function effectively in the oblique directions, in order for the view angle compensation to work.

Similar to the birefringent layer A in the first embodiment, furthermore, the object of the birefringent layer C is not for adding a retardation to the light incoming from the normal direction. On the other hand, the angle formed by the absorption axis of the polarizer and the optical axis of the $\lambda/4$ plate D appears different when observed from the oblique directions compared with the normal direction. This difference in the angle is compensated by the retardation in the birefringent layer C. In other words, the birefringent layer C adds the retardation only to the light incoming from the oblique directions to perform a view angle compensation.

The birefringent layer becomes a uniaxial birefringent layer when it satisfies NZ=1.0. Because the in-plane slow axis becomes the optical axis, the optical axis of the birefringent layer is oriented parallel to the in-plane slow axis, even when it satisfies NZ>1.0 or 1.0>NZ>0.9. Therefore, it is preferred that the in-plane slow axis of the birefringent layer C and the absorption axis of the polarizer form a 90° angle, when the circularly polarizing plate is viewed from the normal direction, but it is also acceptable that the angle slightly deviates from 90°, as long as it is within a range in which a high contrast ratio can be realized across a wide view angle or, in other words, as long as an anti-reflective effect can be realized. Specifically, the effects of the present invention can be adequately obtained, if the angle between the in-plane slow axis of the birefringent layer C and the absorption axis of the polarizer, when the circularly polarizing plate is viewed from the normal direction, is within a range of 90°±1° (89° to 91°).

Figure 24:
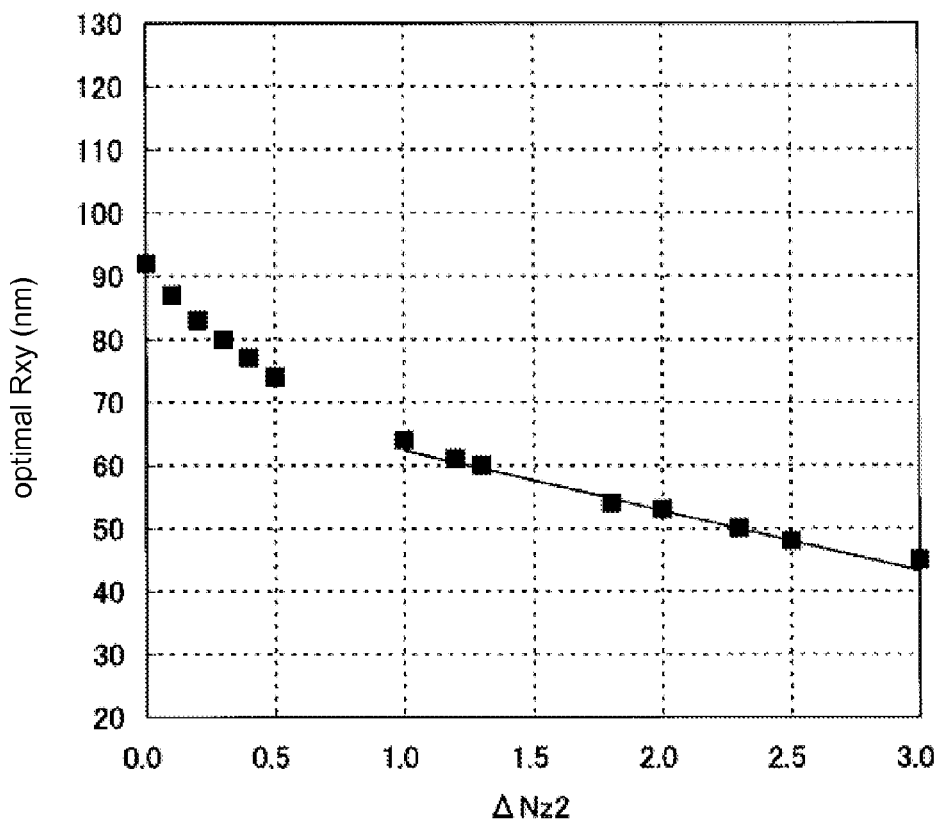
FIG. 24 is a drawing showing a relationship between ΔNZ2 and optimal Rxy of the birefringent layer C according to a second embodiment.

Here, measurement results obtained by computer simulation on a relationship between the biaxial parameter ΔNZ2 of the birefringent layer C and the optimal in-plane retardation Rxy of the birefringent layer C are shown. FIG. 24 and the Table 4 below are a graph and a table showing the relationship between the ΔNZ2 and the optimal in-plane retardation Rxy of the birefringent layer C of the second embodiment. Because the birefringent layer C satisfies NZ=1.0 when it is a uniaxial birefringent layer, the biaxial parameter ΔNZ2 of the birefringent layer C is defined as |NZ-1|. The optimal Rxy was set at a value at which the contrast ratio is the highest, when the circularly polarizing plate placed on a reflective plate is observed from a direction that is 45° off of the absorption axis of the polarizer.

From the viewpoint of realizing a display with a high contrast ratio across a wide view angle, it is most preferred that the in-plane retardation Rxy of the birefringent layer C be at the optimal value shown in FIG. 24 and Table 4, but it is acceptable that it be slightly off of the optimal value, as long as it is within a range across which the contrast ratio from an oblique view angle does not drop. The range should preferably be the optimal value ±15 nm, from the viewpoint of adequately achieving the effects of the present invention.

As shown in FIG. 24 and Table 4, the relationship between the ΔNZ2 and the optimal in-plane retardation Rxy of the birefringent layer C is in general not simple, but the equation (2) below provides an adequately close approximation across a range of $2.0 \leq NZ \leq 4.0$ ($1.0 \leq \Delta NZ2 \leq 3.0$). The straight line (solid line) shown in FIG. 24 represents this.

$$Rxy = (72 - 9.6 \times \Delta NZ2) \tag{2}$$

Furthermore, it can be said from FIG. 24 and Table 4 that the in-plane retardation Rxy of the birefringent layer C preferably is within the range of 45 to 64 nm across the range of $2.0 \leq NZ \leq 4.0$ ($1.0 \leq \Delta NZ2 \leq 3.0$).

TABLE 4

| Nz of birefringent layer C | ΔNz2 | Rxy of birefringent layer C |
|---|---|---|
| 1.0 | 0.0 | 92 |
| 1.1 | 0.1 | 87 |
| 1.2 | 0.2 | 83 |
| 1.3 | 0.3 | 80 |
| 1.4 | 0.4 | 77 |
| 1.5 | 0.5 | 74 |
| 2.0 | 1.0 | 64 |
| 2.2 | 1.2 | 61 |
| 2.3 | 1.3 | 60 |
| 2.8 | 1.8 | 54 |
| 3.0 | 2.0 | 53 |
| 3.3 | 2.3 | 50 |
| 3.5 | 2.5 | 48 |
| 4.0 | 3.0 | 45 |

When the birefringent layer satisfies NZ=0.0, it becomes a uniaxial birefringent layer. Because the axis (in-plane fast axis), which is orthogonal to the in-plane slow axis, becomes the optical axis, the optical axis of the birefringent layer is oriented parallel to the in-plane fast axis even when it satisfies NZ<0.0 or 0.0<NZ<0.1. Therefore, the optical axis of the $\lambda/4$ plate D is in a direction parallel to the in-plane fast axis.

When the NZ coefficient of the $\lambda/4$ plate D is greater than 0.0, there is a concern that the manufacturing may become difficult, because of a need to satisfy the relationship nx>nz>ny. On the other hand, a birefringent layer satisfying $NZ \leq 0.0$, in general, can easily be manufactured using a regular manufacturing method (for example, a horizontal uniaxial stretching, vertical-horizontal biaxial stretching, or the like). However, an attempt at manufacturing a birefringent layer satisfying $NZ \leq 0.0$ may unintentionally result in a birefringent layer having a NZ of about 0.1. Therefore, manufacturing of the λ/4 plate D satisfying NZ<0.1 can be manufactured with ease.

The λ/4 plate D is placed in such a way that the in-plane fast axis intersects the absorption axis of the polarizer. The combination of the λ/4 plate D and the polarizer makes it possible to achieve the functionality of a left (or right) circularly polarizing plate.

The in-plane fast axis of the λ/4 plate D preferably is aligned in a direction forming a 43 to 47° (more preferably, 45°, effectively) or 133 to 137° (more preferably, 135°, effectively) with respect to the absorption axis of the polarizer when the circularly polarizing plate is viewed from the normal direction. As a result, it is possible to make the light transmitting through the polarizer and the λ/4 plate D be more perfectly circularly polarized. Thus, it is possible to realize the anti-reflective effect more effectively in the normal direction, and as a result, a high contrast ratio can be realized in the normal direction.

It is more preferred that the λ/4 plate D satisfy $-3.0 \leq NZ \leq -0.1$ from the viewpoint of easily manufacturing the λ/4 plate D. This is because a birefringent layer satisfying $-3.0 \leq NZ \leq 0.1$ can be manufactured by conducting a generally known vertical-horizontal biaxial stretching on a material typically having a negative intrinsic birefringence. For this reason, it is preferred that the λ/4 plate D be constructed of a material having a negative intrinsic birefringence. Furthermore, it is possible to make the in-plane fast axis be in a 90° direction (orthogonal direction) with respect to the length direction of a roll shaped retardation film, when the λ/4 plate D satisfying $-3.0 \leq NZ \leq -0.1$ is manufactured using the aforementioned stretching method from a material having a negative intrinsic birefringence.

The birefringent layer (including the λ/4 plate D) used in the present embodiment is not limited to those of specific materials or optical performance. It is possible, for example, to use an stretched polymer film, a liquid crystal material having a fixed orientation, or a thin plate constructed of an inorganic material, or the like.

The birefringent layer (including the λ/4 plate D) used in the present embodiment is not limited to those of specific method of formation. If it is a polymer film, then a solvent casting method or a melt extrusion method, for example, may be used. A method by which a plurality of birefringent layers are simultaneously formed by a co-extrusion method is also possible. A stretching may be conducted or not, as long as the prescribed retardation is achieved. The stretching is not limited to any specific method. A roll-to-roll tension stretch method, a roll-to-roll compressive stretch method, a tenter horizontal uniaxial stretch method, a vertical-horizontal biaxial stretch method, as well as a specialized stretch method in which the stretching is conducted under the effect of a compressive force in a heat shrinking film may be used, for example. Furthermore, a method of coating a liquid crystal material on a substrate film, on which an alignment treatment has been conducted, followed by fixing of the orientation, may, for example, be used, if it is a liquid crystal material. A method, in which a special alignment treatment is not conducted on the substrate film, or a method including a peeling from the substrate film and a transfer to another film after the orientation is fixed, for example, may be used as long as the prescribed retardation is achieved. Furthermore, it is also possible to use a method in which the liquid crystal material orientation is not fixed. Furthermore, when a non-liquid crystal material is used, a method similar to that used in case of the liquid crystal material may also be used. More specific descriptions are provided below by the types of birefringent layers.

A film made by stretching a material having a positive intrinsic birefringence as a component, for example, may be used as the birefringent layer C, as appropriate. It is acceptable that the birefringent layer C be two or more layers of birefringent layers which are laminated, but a single layer (formed with a unitary film) is preferred from the viewpoint of making the manufacturing easy and low cost, as described earlier. Materials having a positive intrinsic birefringence, for example, include polycarbonate, polysulfone, polyethersulfone, polyethylene terephthalate, polyethylene, polyvinyl alcohol, norbornene, triacetyl cellulose, and diacetyl cellulose.

A film made by stretching a material having a negative birefringence as a component, or a film made by stretching, under the effect of a compressive force in a heat shrinking film, a material having a positive intrinsic birefringence as a component, for example, may be used, as appropriate, for the λ/4 plate D. Among these, the film made by stretching a material having a negative birefringence as a component is preferred from the viewpoint of simplifying the manufacturing method. While it is acceptable that the λ/4 plate D be two or more layers of birefringent layers which are laminated, a single layer (formed with a unitary film) is preferred from the viewpoint of making the manufacturing easy and low cost, as described above. Materials having a negative intrinsic birefringence include, for example, polystyrene, polyvinyl naphthalene, polyvinyl biphenyl, polyvinyl pyridine, poly methyl methacrylate, poly methyl acrylate, N substituted maleimide copolymer, fluorene based polycarbonate, and triacetyl cellulose (those especially of low degree of acetylation).

The anti-reflective layer (anti-reflective film) is formed on the surface of the circularly polarizing plate and is a layer (film) having a function of suppressing reflection on the surface of the circularly polarizing plate. Similar to the first embodiment, the anti-reflective layer may be an antireflection layer (AR layer) and low reflection layer (LR), in which the anti-reflective effect is obtained with laminated thin films having controlled refractive index and thickness as well as a moth eye structure, in which an anti-reflective effect is obtained with a microstructure such as those seen in the eyes of a moth.

Here, the circularly polarizing plate of the present embodiment can achieve an anti-reflective effect without the anti-reflective layer, but the anti-reflective layer is formed for the reasons similar to those of the first embodiment. In other words, with the anti-reflective layer, it is worthwhile to take care of the reflectance dependence on the view angle due to the reflected light resulting from a reflection inside the display device, such as the liquid crystal cell.

Furthermore, similar to the first embodiment, the moth eye structure is suited for the anti-reflective layer from the viewpoint of more effectively appreciating an anti-reflective effect against the reflected light resulting from reflections internal to the display device such as in the liquid crystal cells.

Embodiment 3

Figure 25:
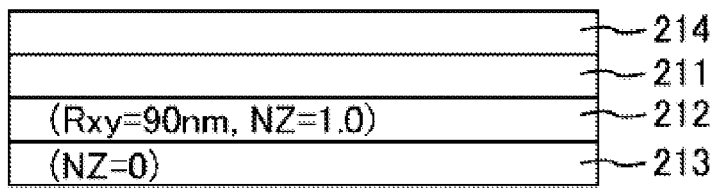
FIG. 25 is a cross-sectional schematic drawing showing the circularly polarizing plate of Embodiment Example 3.

A circularly polarizing plate of Embodiment 3 relating to the second embodiment is described below. FIG. 25 is a cross-sectional schematic drawing showing a circularly polarizing plate of Embodiment 3.

An anti-reflective film 214 having a moth eye structure, a linear polarizer 211, a birefringent layer 212, and a λ/4 plate 213 are laminated in the order shown in FIG. 25 to construct the circularly polarizing plate (circularly polarizing film) of Embodiment 3. Optical parameters of each film, such as the axis angle and retardation value, or the like, are shown in the figure. The direction of the absorption axis of the linear polarizer 211 was set to be at the 0° azimuth angle.

Figure 26:
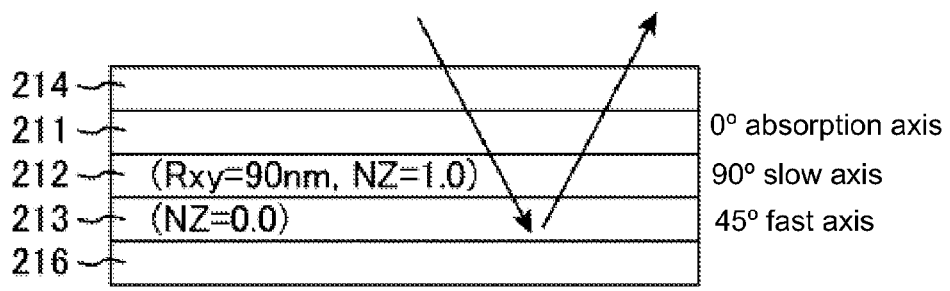
FIG. 26 is a cross-sectional schematic drawing showing the circularly polarizing plate of Embodiment Example 3 placed on the anti-reflective plate.
Figure 27:
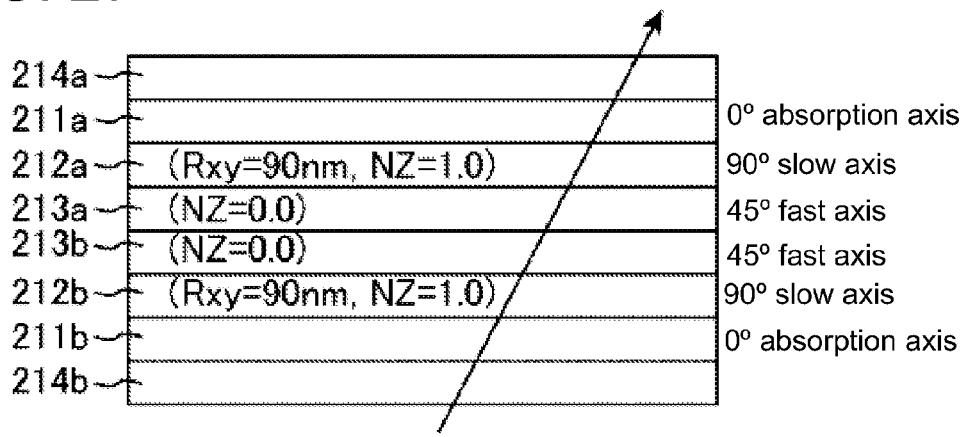
FIG. 27 is a cross-sectional schematic drawing showing a structure optically equivalent to the structure of FIG. 26.

The anti-reflective mechanism of the circularly polarizing film of Embodiment 3 is described using the Poincare sphere. FIG. 26 is a cross-sectional schematic drawing showing the circularly polarizing plate of the third embodiment placed on a reflective plate. FIG. 27 is a cross-sectional schematic drawing showing an optically equivalent structure as the structure shown in FIG. 26.

Although it would be desirable to describe the changes in the optical polarization states of the reflected light in the structure in FIG. 26 (the circularly polarizing plate of Embodiment 3 placed on the reflective plate 216) using the Poincare sphere, it is difficult to explain this effect when reflection at the reflective plate is included. For this reason, the changes in the polarization states of the transmitted light are considered and explained for the structure in FIG. 27 instead, which is optically equivalent to the structure of FIG. 26. In other words, as shown in FIG. 27, the structure in which an anti-reflective film 214a having a moth eye structure, a linear polarizer 211a, a birefringent layer 212a, a λ/4 plate 213a, a λ/4 plate 213b, a birefringent layer 212b, a linear polarizer 211b, and an anti-reflective film 214b, having a moth eye structure, are laminated in this order, will be explained. The optical parameters of each film, including, for example, the axis angle and retardation value, or the like, are shown in the figure. The direction of absorption axis of the linear polarizers 211a and 211b was chosen to be at the 0° azimuth angle.

Figure 28:
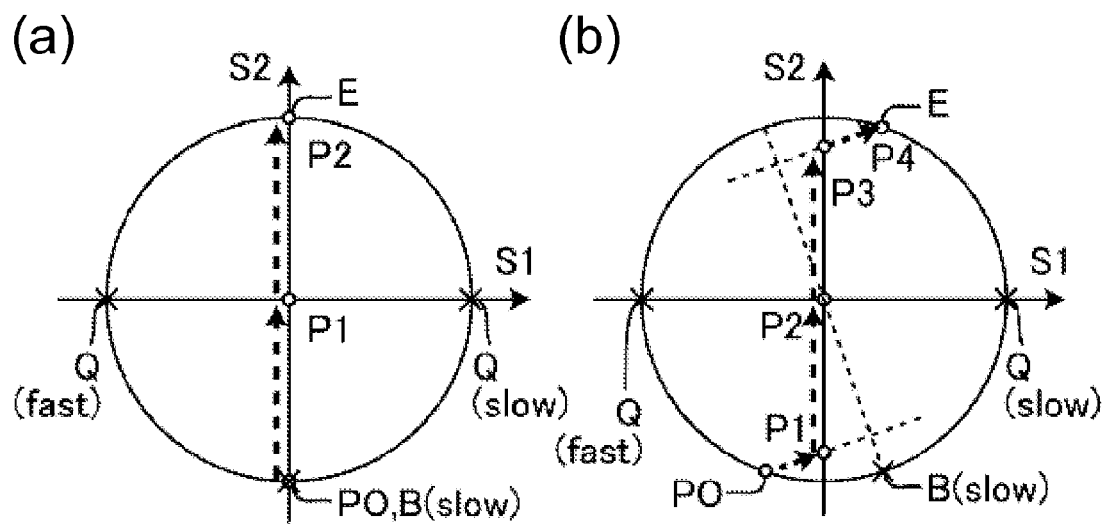
FIG. 28 is a drawing showing the changes in the polarization states in the circularly polarizing plate in FIG. 27 which are projected on to the S1-S2 plane of the Poincare sphere.

Furthermore, instances in which the circularly polarizing plate in FIG. 27 is observed from the front direction (normal direction) and from the 45° azimuth and 60° inclination are considered here. FIG. 28 is a drawing in which the changes in the polarization states in the circularly polarizing plate of FIG. 27 are projected on to the S1-S2 plane of the Poincare sphere. FIG. 28(a) is a drawing for an observation made from the front direction (normal direction), while FIG. 28(b) is a drawing for an observation made from an oblique direction (45° azimuth and 60° inclination). Here in FIG. 28, E represents the extinction point of the upper polarizer (linear polarizer 211a), P0 represents the polarization state immediately after a transmission through the lower polarizer (linear polarizer 211b), B (fast) represents the fast axe of the birefringent layers 212a and 212b, B (slow) represents the slow axe of the birefringent layers 212a and 212b, and Q (slow) represents the slow axe of the λ/4 plates 213a and 213b.

When the observation is made from the normal direction, as shown in FIG. 28(a), the polarization state does not change at all, even after a transmission through the lower birefringent layer 212b, because P0 and B (slow) are overlapped. Furthermore, as a result of a transmission through the λ/4 plate 213b, P0 transitions to P1 (circular polarization) in the southern hemisphere with a quarter revolution anti-clockwise centered around (a line connecting the origin and) Q (slow). P1 then transitions to P2 (linear polarization) because of a second transmission through the upper λ/4 plate 213a. Furthermore, with nothing happening in the upper birefringent layer 212a, the polarization state remains unchanged at P2. Because P2 corresponds to the point E, which is the extinction point of the upper polarizer (linear polarizer 211a), the light does not transmit therethrough. In other words, an anti-reflective effect takes place when the observation is made from the normal direction.

When the observation is made at the 45° azimuth and 60° inclination, as shown in FIG. 28(b), P0 transitions to P1 in the southern hemisphere after a revolution of a specific angle centered around B (slow), as a result of a transmission through the lower birefringent layer 212b. Next, it transitions to P2 (circular polarization) as a result of a transmission through the λ/4 plate 213b. Then, the polarization state transitions from P2 to P3 as a result of a second transmission through the upper λ/4 plate 213a, and P3 transitions to P4 (linear polarization) as a result of a transmission through the upper birefringent layer 212a finally. Because P4 approximately overlaps the extinction point in the upper polarizer (linear polarizer 211a), the anti-reflective effect is obtained even when the observation is made from this oblique direction.

Figure 29:
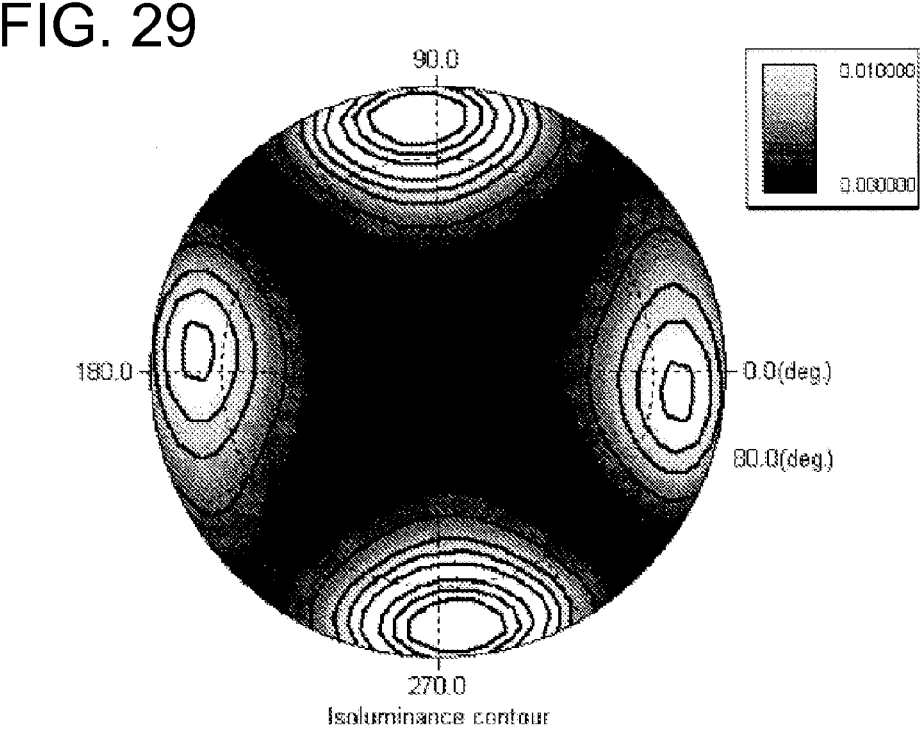
FIG. 29 shows the reflectance of the circularly polarizing plate of Embodiment Example 2 calculated by simulation.

The calculated results on reflectance, obtained by computer simulation, for the circularly polarizing film of Embodiment 3 will be described. Specifically, the circularly polarizing plate of Embodiment 3 was placed on a reflective plate, and the regular reflectance was calculated for all directions. Here, the simulation was made under a condition in which the reflectance is set at 1 when reflectance is at the maximum value—i.e., when the anti-reflective effect is not achieved at all. FIG. 29 shows the reflectance of the circularly polarizing plate of Embodiment 3, as calculated by simulation. As it can be understood from FIG. 29, it was found that the anti-reflective effect is obtained across a wide view angle, and not only in the normal direction according to the present embodiment.

Furthermore, the circularly polarizing plate of the second embodiment was actually manufactured and placed on a minor formed by aluminum vapor deposition to verify the anti-reflective effect. The anti-reflective effect across a wide view angle similar to the simulation results was obtained.

Embodiment 4

Figure 30:
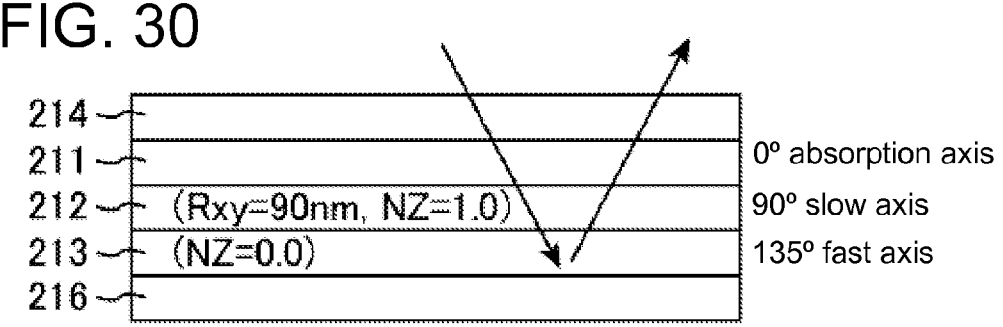
FIG. 30 is a cross-sectional schematic drawing showing the circularly polarizing plate of Embodiment Example 4 placed on an anti-reflective plate.
Figure 31:
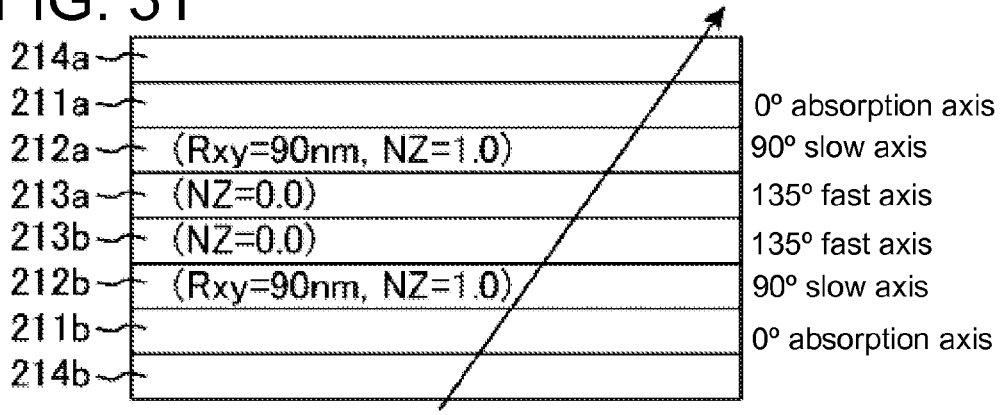
FIG. 31 is a cross-sectional schematic drawing showing a structure equivalent to the structure of FIG. 30.

A circularly polarizing plate of Embodiment 4 according to the second embodiment is described below. FIG. 30 is a cross-sectional schematic drawing showing a circularly polarizing plate of Embodiment 4 placed on a reflective plate. FIG. 31 is a cross-sectional schematic drawing showing an optically equivalent structure to the structure of FIG. 30. The optical parameters of each film, such as the axis angle and retardation value, or the like, are shown in the drawings. The absorption axis direction of the linear polarizer 211 was set to be at the 0° azimuth angle.

An anti-reflective film 214, which has a moth eye structure, a linear polarizer 211, a birefringent layer 212, and a λ/4 plate 213 are laminated in the order shown in FIG. 30 to be the circularly polarizing plate (circularly polarizing film) of Embodiment 4. The circularly polarizing plate of Embodiment 4 is placed on a reflective plate 216. Furthermore, as shown in FIG. 31, a structure optically equivalent to the structure of FIG. 30 is a lamination of an anti-reflective film 214a, which has a moth eye structure, a linear polarizer 211a, a birefringent layer 212a, a λ/4 plate 213a, a λ/4 plate 213b, a birefringent layer 212b, a linear polarizer 211b, and an anti-reflective film 214b, which has a moth eye structure, in this order. Accordingly, only the direction of the slow axis of the λ/4 plate 213 differs by 90° between Embodiment 4 and Embodiment 3, and therefore, the anti-reflective effect is achieved in the present embodiment according to the concept based on the Poincare sphere similar to those of Embodiment 4.

Comparison Example 1

Figure 32:
FIG. 32 is a cross-sectional schematic drawing showing a circularly polarizing plate of comparison example 1.

The circularly polarizing plate of the comparison example 1 is described below. FIG. 32 is a cross-sectional schematic drawing showing a circularly polarizing plate of the comparison example 1.

An anti-reflective film 414, which has a moth eye structure, a linear polarizer 411, and a λ/4 plate 413 are laminated in this order as shown in FIG. 32 to construct the circularly polarizing plate (circularly polarizing film) of the comparison example 1. The optical parameters for each film, such as the axis angle and the retardation value, or the like, are shown in the figure. The absorption axis direction of the linear polarizer 411 was chosen to be at the 0° azimuth angle.

Figure 33:
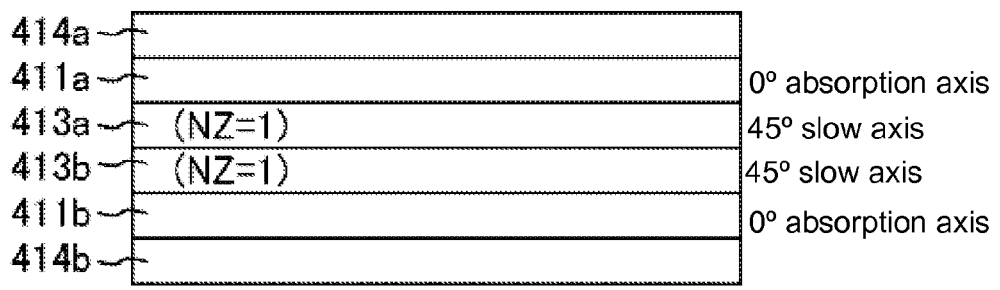
FIG. 33 is a cross-sectional schematic drawing showing a structure optically equivalent to a structure in which the circularly polarizing plate of the comparison example 1 is placed on an anti-reflective plate.

The anti-reflective mechanism of the circularly polarizing film of the comparison example 1 will be described using the Poincare sphere. It would be desirable to describe the changes in the polarization states of the reflected light in the structure, in which the circularly polarizing plate of the comparison example is placed on a reflective plate, using the Poincare sphere, but this effect is difficult to explain when reflection at the reflective plate is involved. Accordingly, changes in the polarization states of the transmitted light in the structure in FIG. 33, which is an optically equivalent structure to the structure in which the circularly polarizing plate of the comparison example 1 is placed on a reflective plate, will be considered and explained instead. FIG. 33 is a cross-sectional schematic drawing showing the optically equivalent structure as the structure in which the circularly polarizing plate of the comparison example 1 is placed on the reflective plate. In other words, as shown in FIG. 33, an explanation will be provided for a structure in which an anti-reflective film 414a, which has a moth eye structure, a linear polarizer 411a, a λ/4 plate 413a, a λ/4 plate 413b, a linear polarizer 411b, and an anti-reflective film 414b, which has the moth eye structure, are laminated in this order. The optical parameters of each film, such as the axis angle and retardation value, or the like, are shown in the figure. The absorption axis direction of the linear polarizers 411a and 411b was chosen to be at the 0° azimuth angle. Here, FIGS. 32 and 33 show an instance in which the slow axis of the λ/4 plate 413 (413a and 413b) is at the 45° azimuth, and an explanation is provided for this instance using the Poincare sphere. Similar effects can be obtained also when the slow axis of the λ/4 plate 413 (413a and 413b) is at the 135° azimuth.

Figure 34:
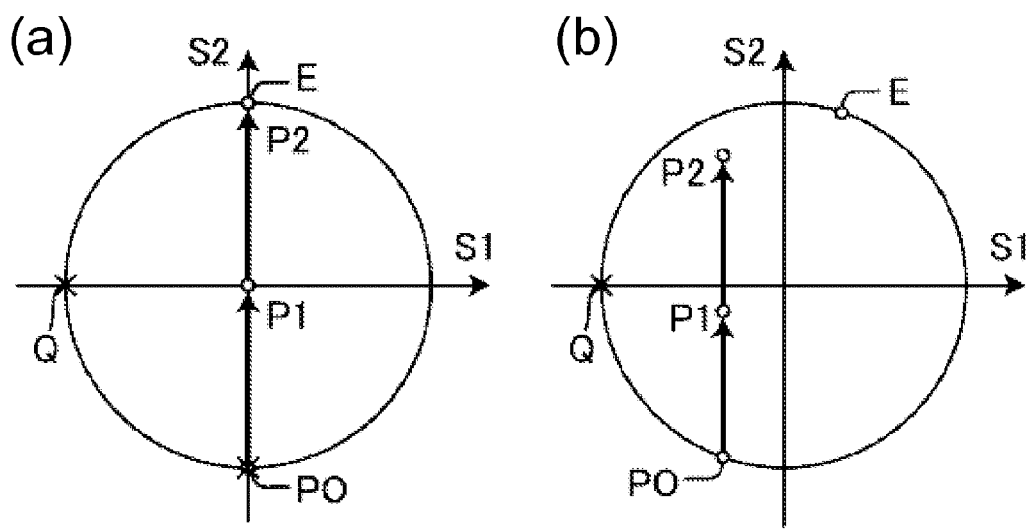
FIG. 34 is a drawing showing the changes in the polarization states in the circularly polarizing plate of FIG. 33 which are projected on to the S1-S2 plane of the Poincare sphere.

Here, instances in which the circularly polarizing plate of FIG. 33 is observed from the front direction (normal direction) and from the 45° azimuth and 60° inclination are considered. FIG. 34 is a drawing showing the changes in the polarization states in the circularly polarizing plate of FIG. 33 that are projected on to the S1-S2 plane of the Poincare sphere. FIG. 34(*a*) is a drawing for an instance in which the observation is made from the front direction (normal direction), while FIG. 34(*b*) is a drawing for an instance in which the observation is made from an oblique direction (45° azimuth and 60° inclination). Here, in FIG. 34, E represents the extinction point of the upper polarizer (linear polarizer 411a), P0 is the polarization state immediately after a transmission through the lower polarizer (linear polarizer 411b) and Q (slow) represents the slow axis of the λ/4 plates 413a and 413b.

When the observation is made from the normal direction, as shown in FIG. 34(*a*), P0 transitions to P1 (circular polarization) in the southern hemisphere after a one-quarter revolution anti-clockwise centered around (a line connecting the origin and) Q (slow), as a result of a transmission through the λ/4 plate 413b. Then, P1 transitions to P2 (linear polarization) because of a transmission through the upper λ/4 plate 413a once more. Because P2 matches the point E, which is the extinction point of the upper polarizer (linear polarizer 411a), the light does not transmit therethrough. In other words, the anti-reflective effect is achieved when the observation is made from the normal direction.

When the observation is made from the 45° azimuth and 60° inclination, as shown in FIG. 34(*b*), P0 goes to P1 as a result of a transmission through the lower λ/4 plate 413b. Then, the polarization state transitions from P1 to P2 as a result of a transmission through the upper λ/4 plate 413a once again. Unlike Embodiment 1, because there is no birefringent layer, the polarization state immediately before the transmission through the upper polarizer (linear polarizer 411a) is P2 (elliptical polarization), which does not match the extinction point E of the upper polarizer (linear polarizer 411a). For this reason, anti-reflective effect cannot be obtained with the observation made from this oblique view angle.

Figure 35:
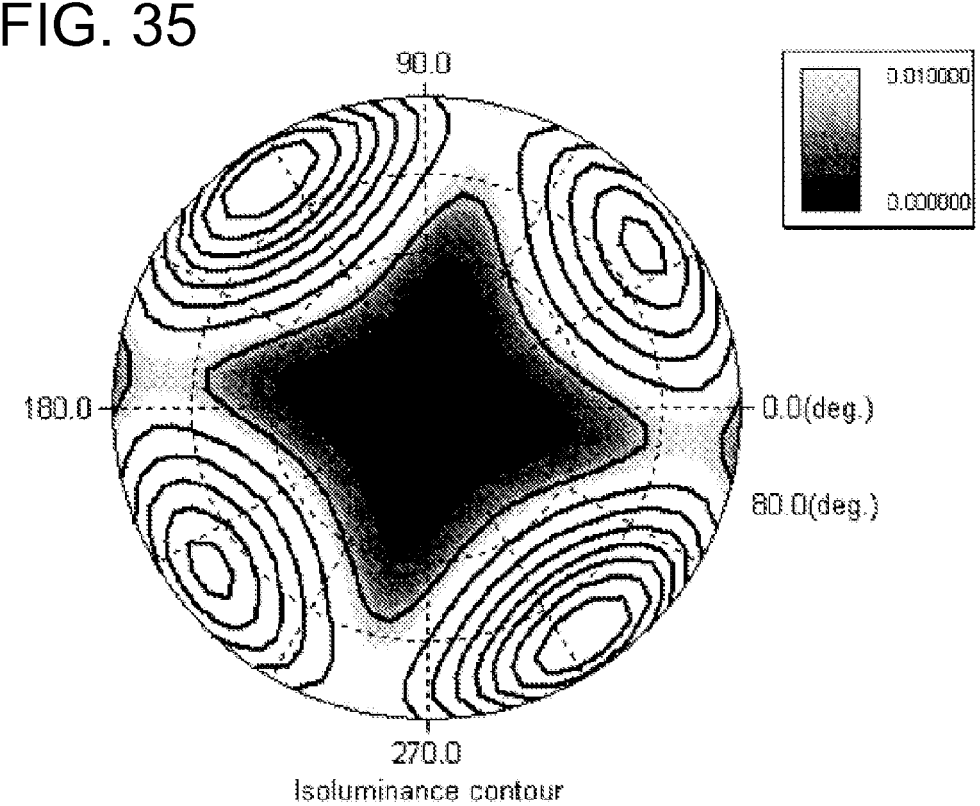
FIG. 35 is a drawing showing the reflectance of the circularly polarizing plate of the comparison example 1 calculated by simulation.

Calculated results on the reflectance, obtained by computer simulation, for the circularly polarizing film of the comparison example 1 will be described. Specifically, the regular reflectance was calculated for all directions for the circularly polarizing plate of the comparison example 1 placed on a reflective plate. Here, the simulation was conducted under the condition that the reflectance would be 1 when anti-reflective effect is not achieved at all—i.e., when the reflectance is at its maximum value. FIG. 35 is a drawing showing the reflectance of the circularly polarizing plate of the comparison example 1 calculated by simulation. As shown in FIG. 35, the anti-reflective effect is obtained only across a narrow view angle according to the comparison example 1. Specifically, the characteristics were poor when the observation was made from the directions having a 45° angle relative to the direction of the absorption axis of the linear polarizer 411.

Reference Example 1

Figures 36, 37, 38:
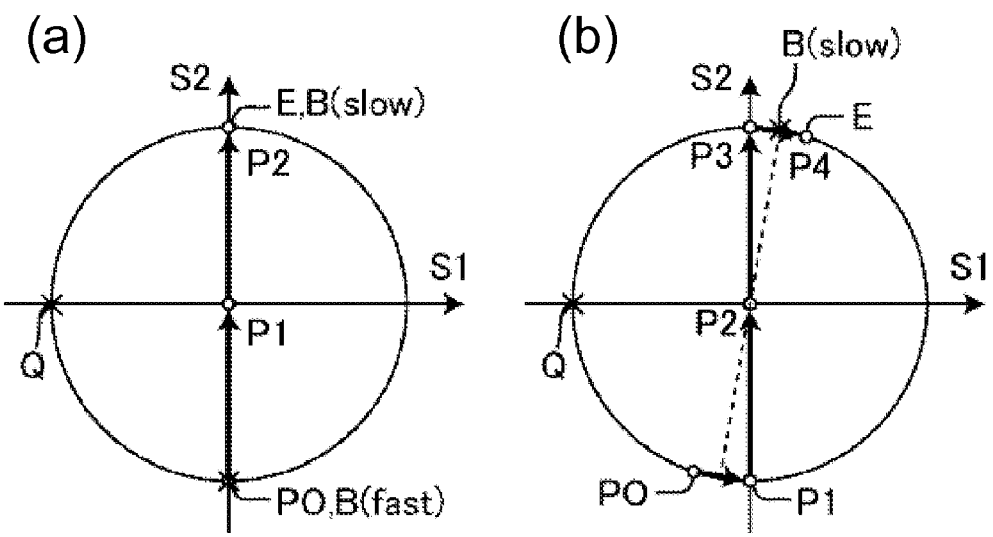
FIG. 36 is a cross-sectional schematic drawing showing the circularly polarizing plate of the reference example 1.
FIG. 37 is a cross-sectional schematic drawing showing a structure optically equivalent to a structure in which the circularly polarizing plate of a reference example 1 is placed on an anti-reflective plate.
FIG. 38 is a drawing showing the changes in the polarization states in the circularly polarizing plate of FIG. 37 which are projected on to the S1-S2 plane of the Poincare sphere.

The polarizing plate of a reference example 1, which is related to a circularly polarizing plate described in the aforementioned Patent Document 6, is described below. FIG. 36 is a cross-sectional schematic drawing of a circularly polarizing plate of the reference example 1.

An anti-reflective film 514, which has a moth eye structure, a linear polarizer 511, a λ/2 plate 517, and a λ/4 plate 513 are laminated in the order shown in FIG. 36 to constitute the circularly polarizing plate (circularly polarizing film) of the reference example 1. In other words, the circularly polarizing plate of the reference example 1 is made by disposing the anti-reflective film 514 on the polarizer plate described in the aforementioned Patent Document 6. The optical parameters of each film, such as the axis angle and retardation value, or the like, are shown in the figure. The absorption axis direction of the linear polarizer 511 was chosen to be at the 0° azimuth angle.

The anti-reflective mechanism of the circularly polarizing film of the reference example 1 is described using the Poincare sphere. It would be desirable to describe the changes in the polarization states of the reflected light in the structure in which the circularly polarizing plate of the reference example 1 is placed on a reflective plate using the Poincare sphere, but this effect is difficult to explain when reflection at the reflection plate is involved. Accordingly, the changes in the polarization states of the transmitted light are considered and explained for the structure in FIG. 37 instead, which is an optically equivalent structure to the structure in which the circularly polarizing plate of the reference example 1 is placed on a reflective plate instead. FIG. 37 is a cross-sectional schematic drawing showing an optically equivalent structure to the structure in which the circularly polarizing plate of the reference example 1 is placed on a reflective plate. In other words, as shown in FIG. 37, a description will be provided for a structure in which an anti-reflective film 514a, which has a moth eye structure, a linear polarizer 511a, a λ/2 plate 517a, a λ/4 plate 513a, a λ/4 plate 513b, a λ/2 plate 517b, a linear polarizer 511b, and an anti-reflective film 514b, which has a moth eye structure, are laminated in this order. The optical parameters of each film, such as the axis angle and retardation value, or the like, are shown in the figure. The absorption axis direction of the linear polarizers 511a and 511b was chosen to be at the 0° azimuth angle. Here, FIGS. 36 and 37 show an instance in which the slow axis of the λ/4 plate 513 (513a and 513b) is at the 45° azimuth, and the description is provided using the Poincare sphere for that instance. However, similar effects can be obtained even in an instance in which the slow axis of the λ/4 plates 513 (513a and 513b) is at 135°.

Furthermore, instances in which the circularly polarizing plate in FIG. 37 is observed from the front direction (normal direction) and from the 45° azimuth and 60° inclination are considered here. FIG. 38 is a drawing showing the changes in the polarization states in the circularly polarizing plate of FIG. 37, which are projected onto the S1-S2 plane of the Poincare sphere. FIG. 38(a) is a drawing for an observation made from the front direction (normal direction), while FIG. 38(b) is a drawing for an observation made from an oblique direction (45° azimuth and 60° inclination). Here, in FIG. 38, E is the extinction point of the upper polarizer (linear polarizer 511a), P0 represents the polarization state immediately after a transmission through the lower polarizer (linear polarizer 511b), B (fast) is the fast axis of the λ/2 plates 517a and 517b, B (slow) is the slow axis of the λ/2 plates 517a and 517b, and Q (slow) is the slow axis of the λ/4 plates 513a and 513b.

When the observation is made from the normal direction, as shown in FIG. 38(a), the polarization state does not change at all even after the transmission through the lower λ/2 plate 517b because P0 and B (slow) overlap. Furthermore, P0 transitions to P1 (circular polarization) after a one-quarter revolution anti-clockwise centered around (a line which connects the origin and) Q (slow), as a result of a transmission through the λ/4 plate 513b. Then, P1 transitions to P2 (linear polarization) as a result of a second transmission through the upper λ/4 plate 513a. Then, because nothing happens in the upper λ/2 plate 517a, the polarization state does not change and remains at P2. Because P2 matches the point E of extinction in the upper polarizer (linear polarizer 511a), the light does not transmit therethrough. In other words, the anti-reflective effect is achieved when the observation is made from the normal direction.

When the observation is made from the 45° azimuth and 60° inclination, as shown in FIG. 38(b), P0 transitions to P1 (linear polarization) after a revolution by a prescribed angle centered around B (slow) as a result of a transmission through the lower λ/2 plate 517b of NZ=0.5. Next, as a result of a transmission through the λ/4 plate 513b, it transitions to P2 (circular polarization). Even when the observation is made from the oblique direction, the effective retardation values remain at λ/4 for the λ/4 plates 513a and 513b in the current instance, in which the λ/4 plates 513a and 513b of NZ=0.5 are used. Therefore, the angle of revolution from P1 to P2 is a ¼ revolution. Then, the polarization state transitions (a quarter revolution) from P2 to P3 (linear polarization) as a result of a transmission through the upper λ/4 plate 513a. Finally, P3 transitions to P4 (linear polarization) as a result of a transmission through the upper λ/2 plate 517a. Because P4 almost matches the extinction point in the upper polarizer (linear polarizer 511a), the anti-reflective effect is obtained even in an instance in which the observation is made from this oblique view angle.

Figure 39:
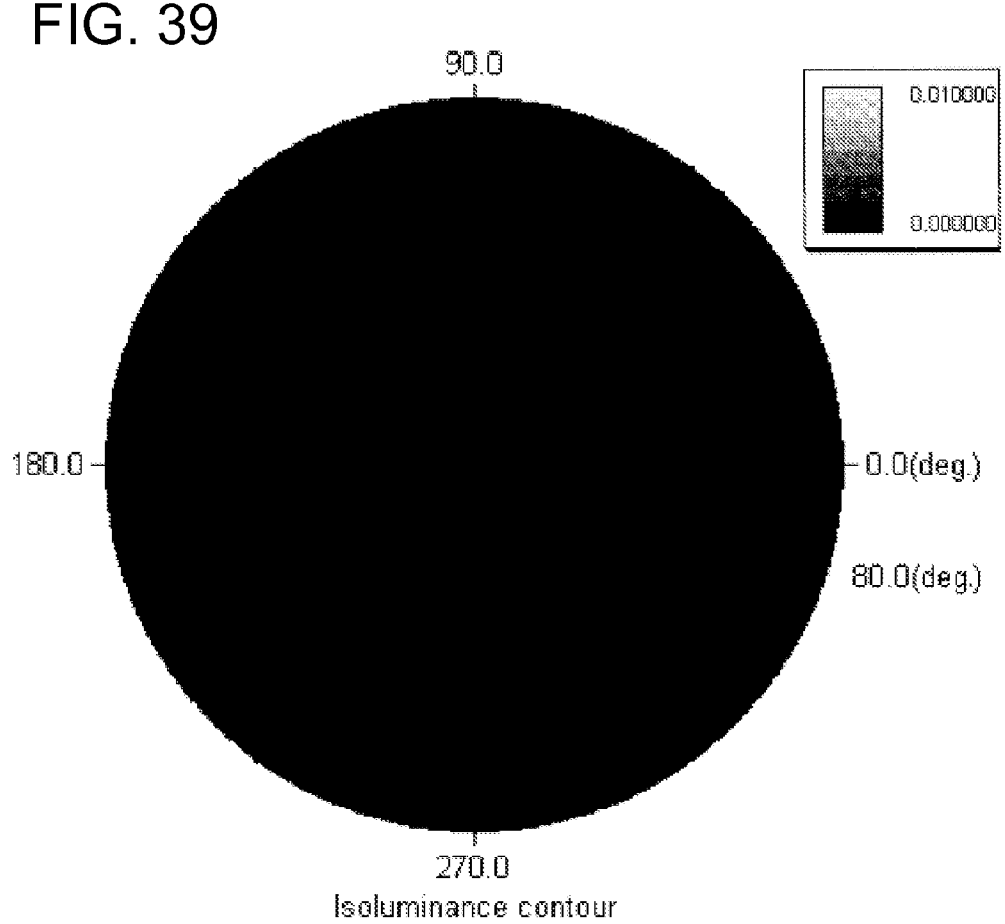
FIG. 39 is a drawing showing the reflectance of the circularly polarizing plate of the reference example 1 calculated by simulation.

The calculated results on the reflectance obtained by computer simulation are described for the circularly polarizing film of the reference example 1. Specifically, the regular reflectance was calculated for all directions for the circularly polarizing plate of the reference example 1 placed on a reflective plate. Simulation was conducted under a condition in which the reflectance is 1 when the anti-reflective effect is not obtained at all—i.e., when the reflectance is at its maximum. FIG. 39 is a drawing showing the reflectance of the circularly polarizing plate of the reference example 1 calculated by simulation. As shown in FIG. 39, the anti-reflective effect is obtained across a wide view angle and not only in the normal direction according to the present embodiment. However, birefringent layers (λ/2 plate 517 and λ/4 plate 513) of 0.1<NZ<0.9, which are difficult to manufacture, are used.

Reference Example 2

Figure 40:
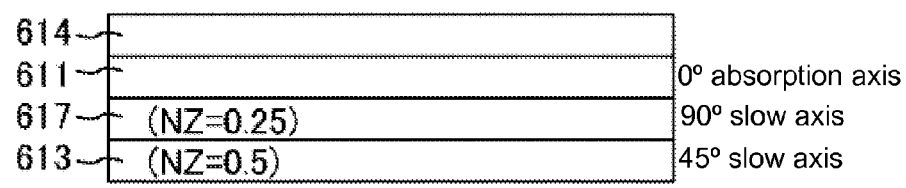
FIG. 40 is a cross-sectional schematic drawing showing the circularly polarizing plate of a reference example 2.

A circularly polarizing plate of a reference example 2, which is related to a polarizing plate described in the aforementioned Patent Document 5 is described below. FIG. 40 is a cross-sectional schematic drawing showing a circularly polarizing plate of the reference example 2.

An anti-reflective film 614, which has a moth eye structure, a linear polarizer 611, a λ/2 plate 617, and a λ/4 plate 613 are laminated in the order shown in FIG. 40 to constitute a circularly polarizing plate (circularly polarizing film) of the reference example 2. In other words, the circularly polarizing plate of the reference example 2 is made by disposing an anti-reflective film 614 on the polarizing plate described in the aforementioned Patent Document 5. The optical parameters of each film, such as the axis angle and retardation value, or the like, were shown in the figure. The direction of the absorption axis of the linear polarizer 611 was set to be at the 0° azimuth angle.

Figure 41:
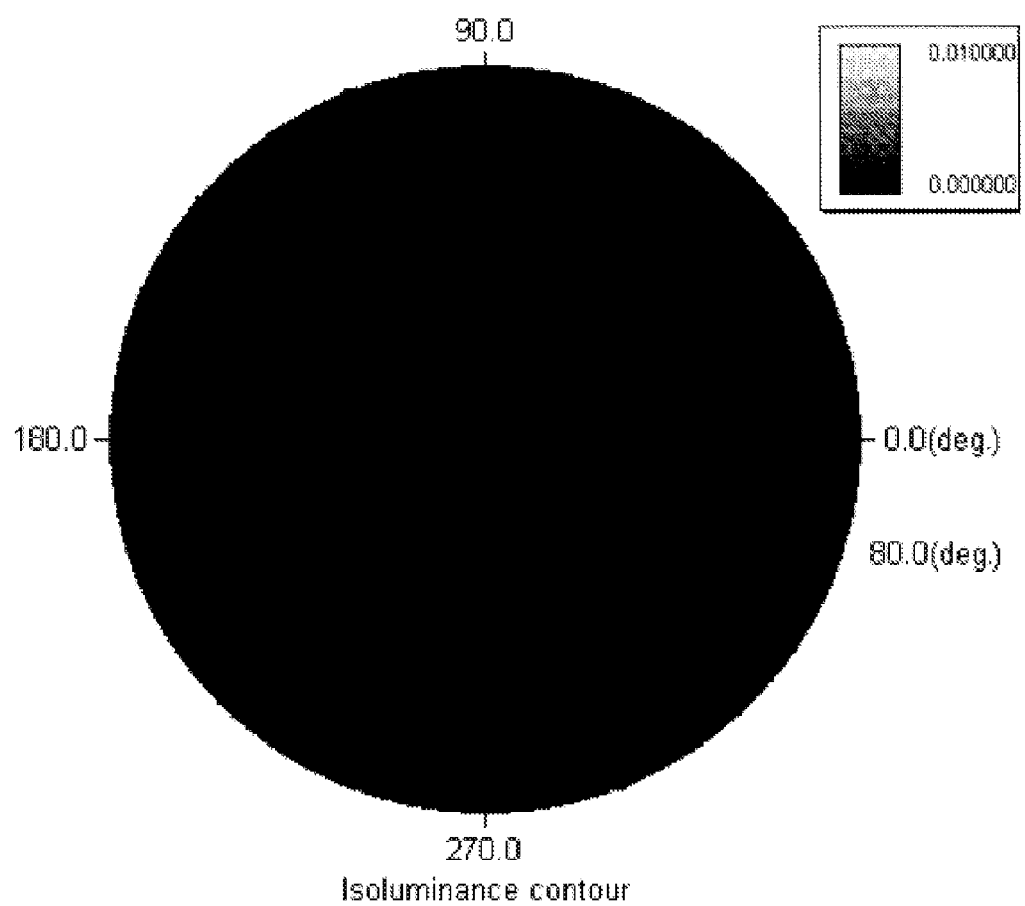
FIG. 41 is a drawing showing the reflectance of the circularly polarizing plate of the reference example 2 calculated by simulation.

The calculated results on the reflectance of the circularly polarizing film of the reference example 2, which was obtained by computer simulation, will be described. Specifically, the regular reflectance was calculated for all directions for the circularly polarizing plate of the reference example 2 placed on a reflective plate. Here, simulation was conducted under a condition in which reflectance is set at 1 when the anti-reflective effect is not obtained at all—i.e., when the reflectance is at its maximum value. FIG. 41 is a drawing showing the reflectance of the circularly polarizing plate of the reference example 2 calculated by simulation. As shown in FIG. 41, the anti-reflective effect was obtained across a wide view angle and not only in the normal direction according to the present embodiment, but birefringent layers (λ/2 plate 617 and λ/4 plate 613) of 0.1<NZ<0.9, which are difficult to manufacture, are used.

Here, the present application is based on Japanese Patent Application No. 2008-296056, which was filed on Nov. 19, 2008, and claims priority from the Japanese application based on the Paris Convention Treaty and the laws of the countries to which it enters as the respective national stages. The content of the aforementioned application is hereby incorporated by reference in its entirety in the present application.

DESCRIPTION OF REFERENCE CHARACTERS 1, 111, 211, 311, 411, 511, 611 polarizer
2, 112, 212, 312 birefringent layer
30 external light
31, 32 reflected light
113, 213, 313, 413, 513, 613 λ/4 plate

114, 214, 414, 514, 614 anti-reflective film (anti-reflective layer)
115, 215 positive C plate
116, 216 reflective plate
120, 320 liquid crystal cell
517, 617 λ/2 plate

The invention claimed is:

1. A circularly polarizing plate comprising:
   an anti-reflective layer;
   a polarizer;
   a birefringent layer; and
   a λ/4 plate,
   wherein said anti-reflective layer, said polarizer, said birefringent layer, and said λ/4 plate are laminated in this order,
   wherein the NZ coefficient of said birefringent layer satisfies NZ<0.1,
   wherein the in-plane fast axis of said birefringent layer is orthogonal to the absorption axis of said polarizer,
   wherein the NZ coefficient of said λ/4 plate satisfies NZ>0.9, and
   wherein the in-plane slow axis of said λ/4 plate intersects the absorption axis of said polarizer.

2. The circularly polarizing plate according to claim 1, wherein the in-plane retardation Rxy of said birefringent layer satisfies Rxy<110 nm.

3. The circularly polarizing plate according to claim 1, wherein the in-plane slow axis of said λ/4 plate forms an angle of 43 to 47° or 133 to 137° with respect to the absorption axis of said polarizer.

4. The circularly polarizing plate according to claim 3, wherein the in-plane slow axis of said λ/4 plate forms an angle of 43 to 47° with respect to the absorption axis of said polarizer, and
   wherein the NZ coefficient of said λ/4 plate satisfies NZ<1.4.

5. The circularly polarizing plate according to claim 4, wherein said λ/4 plate converts polarized incident light that is incident from an oblique direction other than a normal direction and that has passed through said polarizer and said birefringent layer into circularly polarized light.

6. The circularly polarizing plate according to claim 3, wherein the in-plane slow axis of said λ/4 plate forms an angle of 43 to 47° with respect to the absorption axis of said polarizer,
   wherein the NZ coefficient of said λ/4 plate satisfies NZ>1.4,
   wherein said circularly polarizing plate further includes a positive C plate, and
   wherein said anti-reflective layer, said polarizer, said birefringent layer, said λ/4 plate, and said positive C plate are laminated in this order.

7. The circularly polarizing plate according to claim 6, wherein said λ/4 plate and said positive C plate convert polarized light that is incident from an oblique direction other than a normal direction and that has passed through said polarizer and said birefringent layer into circularly polarized light.

8. The circularly polarizing plate according to claim 1, wherein said anti-reflective layer has a moth eye structure.

9. A display device comprising the circularly polarizing plate according to claim 1.

10. A circularly polarizing plate comprising:
    an anti-reflective layer;
    a polarizer;
    a birefringent layer; and
    a λ/4 plate,
    wherein said anti-reflective layer, said polarizer, said birefringent layer, and said λ/4 plate are laminated in this order,
    wherein the NZ coefficient of said birefringent layer satisfies NZ>0.9,
    wherein the in-plane slow axis of said birefringent layer is orthogonal to the absorption axis of said polarizer,
    wherein the NZ coefficient of said λ/4 plate satisfies NZ<0.1, and
    wherein the in-plane fast axis of said λ/4 plate intersects the absorption axis of said polarizer.

11. The circularly polarizing plate according to claim 10, wherein the in-plane retardation Rxy of said birefringent layer satisfies Rxy≦110 nm.

12. The circularly polarizing plate according to claim 10 wherein the in-plane fast axis of said λ/4 plate forms an angle of 43 to 47° or 133 to 137° with respect to the absorption axis of said polarizer.

13. The circularly polarizing plate according to claim 10 wherein said anti-reflective layer has a moth eye structure.

14. A display device comprising the circularly polarizing plate according to claim 10.

* * * * *